United States Patent
Peng

(10) Patent No.: US 8,296,344 B2
(45) Date of Patent: Oct. 23, 2012

(54) TIME DELAY AND FREQUENCY OFFSET CALCULATION SYSTEM AND RELATED METHODS

(75) Inventor: Lianfeng Peng, Gilbert, AZ (US)

(73) Assignee: Comtech EF Data Corp., Tempe, AZ (US)

( * ) Notice: Subject to any disclaimer, the term of this patent is extended or adjusted under 35 U.S.C. 154(b) by 1162 days.

(21) Appl. No.: 12/139,758

(22) Filed: Jun. 16, 2008

(65) Prior Publication Data

US 2009/0037503 A1    Feb. 5, 2009

(51) Int. Cl.
*G06F 15/00* (2006.01)
(52) U.S. Cl. .................................................. 708/200
(58) Field of Classification Search .............. 708/250, 708/422, 426, 200
See application file for complete search history.

(56) References Cited

U.S. PATENT DOCUMENTS

| | | | | |
|---|---|---|---|---|
| 4,097,801 | A * | 6/1978 | Freeman et al. | 368/120 |
| 7,228,104 | B2 | 6/2007 | Collins et al. | |
| 2006/0093076 | A1 * | 5/2006 | Lee et al. | 375/343 |
| 2007/0002937 | A1 * | 1/2007 | Min et al. | 375/150 |
| 2008/0260076 | A1 * | 10/2008 | Lai et al. | 375/344 |

OTHER PUBLICATIONS

Seymour Stein, Algorithms for Ambiguity Function Processing, IEEE 1981.
Franz Hlawatsch, Ambiguity Function of a Linear Signal Space and its Application to Maximum-Likelihood Range/Doppler Estimation, IEEE 1992.
Albert A. Gerlach, High-Speed Coherence Processing Using Sectionalized FT, 1982.
George A. Lampropoulos, Time Delay Estimation with Nonstationary Signals, 1986.

* cited by examiner

*Primary Examiner* — Chuong D Ngo
(74) *Attorney, Agent, or Firm* — Booth Udall, PLC

(57) ABSTRACT

Time delay and frequency offset calculation systems and related methods. System implementations include modules coupled together configured to calculate a time delay and a corresponding frequency offset of a second signal delayed in time relative to a first signal with the maximum value of a magnitude of a delay optimization function. Implementations of a method for calculating a time delay and frequency offset calculate the maximum value of the delay optimization function by generating the cross-correlation of one or more adjacent discrete Fourier transformed blocks corresponding to the first signal and second signal, respectively, of two or more discrete Fourier transformed blocks. The maximum value of the delay optimization function is then identified. Implementations of the method may compare the identified maximum value of the magnitude of the delay optimization function with a threshold to determine whether to continue processing for additional adjacent discrete Fourier transformed blocks.

26 Claims, 12 Drawing Sheets

TIME DELAY AND FREQUENCY OFFSET CALCULATION SYSTEM AND RELATED METHODS

BACKGROUND

1. Technical Field

Aspects of this document relate generally to systems and methods used for signal processing.

2. Background Art

A wide variety of signal processing systems and methods are utilized in nearly every technological area employing electrical signals. For example, digital logic systems often include complex structures for processing incoming signals and generating desired output signals for use by other systems. Computer systems often process many electrical signals simultaneously and include various electrical signal storage and retrieval components. In many conventional communication systems, data is transmitted through use of various methods of modifying characteristics of electrical and electromagnetic signals, such as amplitude, phase, or frequency. Many conventional communication systems include signal processing systems on both the transmission and reception ends of a communication channel to enable the data being communicated through the signals to be sent and retrieved.

SUMMARY

Implementations of a system for calculating a time delay and a frequency offset from at least a first and a second signal derived from at least one signal source may include one or more inputs for at least a first and a second signal and a time delay range module coupled to the one or more inputs. The system may also include a first auto-product function generator coupled to the time delay range module and to the one or more inputs and configured to take the discrete Fourier transform of a first auto-product function generated using the first signal. A second auto-product function generator may be coupled to the time delay range module and to the one or more inputs and may be configured to take the discrete Fourier transform of a second auto-product function generated using the second signal.

A cross-correlation generator may be coupled with the first and the second auto-product function generators and may be configured to generate a first cross-correlation of the discrete Fourier transformed first auto-product function and the discrete Fourier transformed second auto-product function. A delay optimization function generator may be coupled with the cross-correlation generator and may be configured to generate a delay optimization function by taking the inverse discrete Fourier transform of the first cross-correlation. A time delay calculator may be coupled with the delay optimization function generator and may be configured to calculate a time delay using an identified global maximum value of a magnitude of the delay optimization function. A frequency offset calculator may be coupled with the time delay calculator and may be configured to calculate a frequency offset using the time delay. An output module may be coupled with the time delay calculator, the frequency offset calculator, and an external processing module and may be configured to communicate the time delay and the frequency offset value to the external processing module.

Implementations of a system for calculating a time delay and frequency offset may include one, all, or some of the following:

The time delay range module may be configured to select a time delay range and subdivide the time delay range into two or more discrete Fourier transform blocks for the first signal and for the second signal.

The first auto-product function generator and the second auto-product function generator may be configured to generate the first auto-product function using the first signal and the second auto-product function using the second signal for one or more adjacent blocks of the two or more discrete Fourier transform blocks that correspond with the first signal and for the two or more discrete Fourier transform blocks that correspond with the second signal, respectively.

The delay optimization function generator may be configured to generate the delay optimization function for the two or more discrete Fourier transform blocks.

The external processing module may be one of a carrier-in-carrier satellite modem, a radar gun, a microwave telecommunication receiver, a global positioning receiver, and a cellular telephone base station.

Implementations of systems for calculating a time delay and frequency offset may utilize a first method for calculating a time delay and frequency offset between at least a first and a second signal. The method may include providing a first signal and a second signal, the first signal and the second signal having a common component and the second signal delayed in time relative to the first signal. The method may also include generating a first auto-product function using the common component and the first signal and generating a second auto-product function using the common component and the second signal. The method may include generating a delay optimization function using the first auto-product function and the second auto-product function, identifying a global maximum value of a magnitude of the delay optimization function, calculating a time delay, and calculating a frequency offset using the time delay.

Implementations of a first method for calculating a time delay and frequency offset may include one, all, or some of the following:

Identifying a global maximum value of a magnitude of the delay optimization function may further include comparing the value of the magnitude of the delay optimization function with a predetermined threshold or with a calculated threshold.

Implementations of systems for calculating a time delay and frequency offset may utilize a second method for calculating a time delay and a frequency offset from at least a first and a second signal derived from at least one signal source. The method may include selecting a time delay range and subdividing the time delay range into two or more discrete Fourier transform blocks for a first signal and for a second signal which is delayed in time relative to the first signal. The method may also include generating a first auto-product function for one or more adjacent blocks corresponding to the first signal of the two or more discrete Fourier transform blocks and taking the discrete Fourier transform of the first auto-product function.

The method may include generating a second auto-product function for two adjacent blocks corresponding to the second signal of the two or more discrete Fourier transform blocks and taking the discrete Fourier transform of the second auto-product function. Generating a first cross-correlation of the discrete Fourier transformed first auto-product function and the discrete Fourier transformed second auto-product function may also be included in the method. The method may also include generating a delay optimization function for the two or more discrete Fourier transform blocks by taking the inverse discrete Fourier transform of the first cross-correlation and calculating a time delay through identifying a global maximum value of a magnitude of the delay optimization function across the time delay range. The method may include calculating a frequency offset with the time delay and outputting the time delay and the frequency offset for processing by an external processing module.

Implementations of a second method for calculating a time delay and a frequency offset may include one, all, or some of the following:

Generating a second auto-product function may further include generating a subsequent second auto-product function for a second two adjacent blocks of the two or more discrete Fourier transform blocks corresponding to the second signal that are adjacent to the first two adjacent blocks and taking the discrete Fourier transform of the subsequent second auto-product function.

Generating a first cross-correlation may further include generating a second cross-correlation of the discrete Fourier transformed subsequent first auto-product function and the discrete Fourier transformed subsequent second auto-product function.

The first signal may be a desired signal and the second signal may be a burst transmission containing a preamble, and if a global maximum value of the magnitude of the delay optimization function is identified, the preamble of the burst transmission may correspond with the desired signal. The method may further include receiving the burst transmission and communicating the burst transmission to the external processing module.

The first signal may include one or more desired signals and the second signal may be a transmission containing a preamble, and if a global maximum value of the magnitude of the delay optimization function is identified, the preamble of the transmission corresponds with one of the one or more desired signals. The method may further include receiving the transmission and routing the transmission to one or more external processing modules corresponding with the transmission.

Subdividing the time delay range into two or more subsequent discrete Fourier transform blocks for the first signal and for the second signal longer in time than the previous discrete Fourier transform blocks if no global maximum value of the magnitude of the delay optimization function for the previous discrete Fourier transform blocks was identified.

The external processing module may be one of a carrier-in-carrier satellite modem, a radar gun, a microwave telecommunication receiver, a global positioning receiver and a cellular telephone base station.

Implementations of a system for calculating a time delay and a frequency offset may utilize a third method for calculating a time delay and a frequency offset from at least a first and a second signal derived from at least one signal source. The method may include selecting a time delay range and subdividing the time delay range into two or more discrete Fourier transform blocks for a first signal and for a second signal which is delayed in time relative to the first signal. The method may include generating a first auto-product function for a one or more adjacent blocks corresponding with the first signal of the two or more discrete Fourier transform blocks and taking the discrete Fourier transform of the first auto-product function. The method may also include generating a second auto-product function for a first two adjacent blocks corresponding with the second signal of the two or more discrete Fourier transform blocks and taking the discrete Fourier transform of the second auto-product function.

The method may include generating a first cross-correlation of the discrete Fourier transformed first auto-product function and the discrete Fourier transformed second auto-product function. Also, generating a delay optimization function for the first two adjacent Fourier transform blocks of the two or more discrete Fourier transform blocks by taking the inverse discrete Fourier transform of the cross-correlation may be included. The method may include identifying a first maximum value of the magnitude of the delay optimization function for the first two adjacent Fourier transform blocks of the two or more discrete Fourier transform blocks and comparing the first maximum value of the magnitude of the delay optimization function to a threshold. If the first maximum value is equal to or greater than the threshold, the method may include calculating a time delay and a frequency offset using the first maximum value of the magnitude and outputting the time delay and frequency offset for processing by an external processing module Implementations of a third method of calculating a time delay and frequency offset may include one, all, or some of the following:

If the first maximum value is less than the predetermined threshold, the method may include selecting a second two adjacent Fourier transform blocks for the second signal from the two or more discrete Fourier transform blocks, the second two adjacent Fourier transform blocks adjacent to the first two adjacent Fourier transform blocks. The method may also include generating a subsequent second auto-product function, generating a second cross-correlation using the first auto-product function and the subsequent second auto-product function, and generating a delay optimization function for the second two adjacent Fourier transform blocks. The method may also include calculating a second maximum value of the magnitude of the delay optimization function and determining whether the second maximum value of the magnitude of the delay optimization function is equal to or greater than the threshold.

The method may further include repeating selection of additional two adjacent Fourier transform blocks for the second signal from the two or more discrete Fourier transform blocks, the additional two adjacent Fourier transform blocks adjacent to the second two adjacent discrete Fourier transform blocks. The method may also include generating a subsequent second auto-product function, a cross-correlation, and a delay optimization function for the additional two discrete adjacent Fourier transform blocks and calculating a maximum value of a magnitude of the delay optimization function until the maximum value is equal to or greater than the threshold.

After maximum values of the magnitudes of the delay optimization functions for all of the two or more discrete Fourier transform blocks have been calculated, if none of the maximum values of the magnitudes are equal to or greater than the threshold, the method further includes subdividing the time delay range into two or more subsequent discrete Fourier transform blocks for the first signal and for the second signal, the two or more subsequent discrete Fourier transform blocks longer in time than the previous two or more discrete Fourier transform blocks.

The first signal may be a desired signal and the second signal may be a burst transmission containing a preamble, and if a global maximum value of the magnitude of the delay optimization function is identified, the preamble of the burst transmission may correspond with the desired signal. The method may further include receiving the burst transmission and communicating the burst transmission to the external processing module.

The first signal may include one or more desired signals, the second signal may be a transmission containing a preamble, and if a global maximum value of the magnitude of the delay optimization function is identified, the preamble of the transmission may correspond to one of the one or more desired signals. The method may further include receiving the transmission and routing the transmission to one or more external processing modules corresponding with the transmission.

The external processing module may be one of a carrier-in-carrier satellite modem, a radar gun, a microwave telecommunication receiver, a global positioning receiver, and a cellular telephone base station.

The threshold may be a predetermined threshold or a calculated threshold.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

Figure 1A:
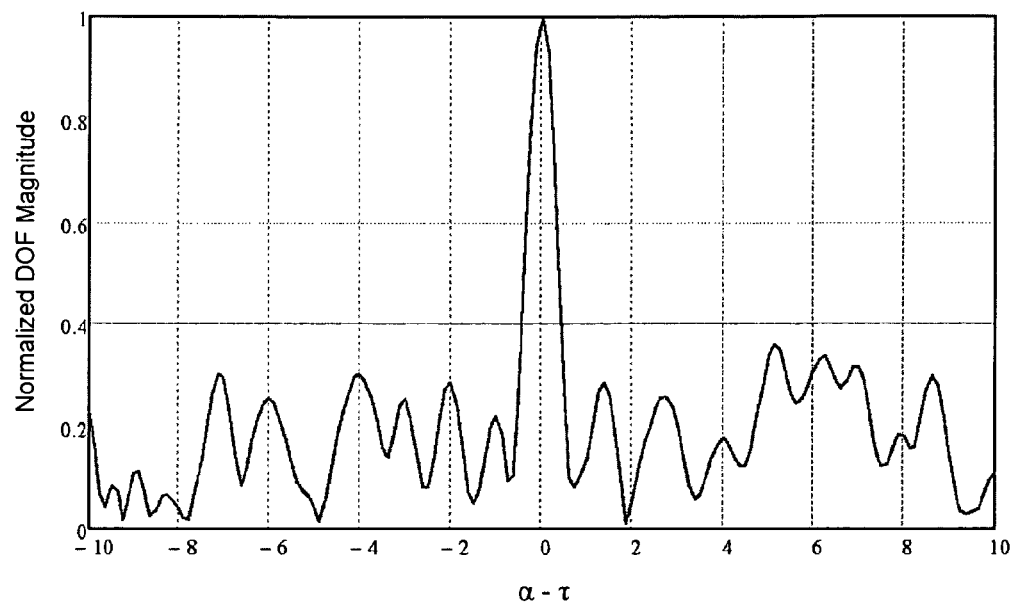
FIG. 1A is a graph of an implementation of a delay optimization function.

This disclosure, its aspects and implementations, are not limited to the specific components or assembly procedures disclosed herein. Many additional components and assembly procedures known in the art consistent with the intended time delay and frequency offset calculation system and/or assembly procedures for a time delay and frequency offset calculation system will become apparent for use with particular implementations from this disclosure. Accordingly, for example, although particular implementations are disclosed, such implementations and implementing components may comprise any shape, size, style, type, model, version, measurement, concentration, material, quantity, and/or the like as is known in the art for such time delay and frequency offset calculation systems and implementing components, consistent with the intended operation.

Implementations of time delay and frequency offset calculation systems and related methods involve signal processing of a two-dimensional ambiguity function for two signals $s_1(t)$ and $s_2(t)$ (both functions of time). Solving the ambiguity function allows calculation of a time delay and frequency offset for two signals that are related to each other (often replicas) but that contain independent noise. Such a situation occurs when the two signals originate from a common source but are received 1) at different times and/or 2) while the receiver may be moving relative to the source. The result is that the two signals (each containing independent noise) may be received at different times, creating a time delay and also a frequency offset between them (also known as a Doppler shift) because of motion of the receiver relative to the source. The two signals may be waveforms, and because they are related to each other, each can be expressed in terms of a common component $s_0(t)$. When expressed in terms of their common component, the signals may be represented as follows:

$$s_1(t)=s_0(t)+n_1(t) \tag{1}$$

$$s_2(t)=s_0(t-\tau)e^{j\Omega t}+n_2(t) \tag{2}$$

where $n_1(t)$ and $n_2(t)$ are noise variables independent of each other, $\tau$ is the time delay between the two signals, and $\Omega$ is the frequency offset between the two signals.

The corresponding ambiguity function $AF(\alpha, \omega)$ can be represented as follows:

$$AF(\alpha,\omega)=\int_{-\infty}^{\infty}s_1(t)s_2^*(t+\alpha)e^{-j\omega t}dt \tag{3}$$

where $s_2^*(t+\alpha)$ is the complex conjugate of $s_2(t+\alpha)$, $\alpha$ is the estimated delay, and $\omega$ is the estimated frequency offset.

Since the Fourier transform of a function is given by $$F\{f(t)\}F(\omega)=\int_{-\infty}^{\infty}f(t)e^{-j\omega t}dt \tag{4}$$

if $$f(t)=s_1(t)s_2^*(t+\alpha) \tag{5}$$

then $$AF(\alpha,\omega)=F\{f(t)\}=\int_{-\infty}^{\infty}s_1(t)s_2^*(t+\alpha)e^{-j\omega t}dt \tag{6}$$

and the ambiguity function is therefore the Fourier transform of the cross-correlation f(t).

Because the ambiguity function includes the cross-correlation of the $s_1(t)$ and $s_2(t)$ and the value of the cross-correlation of two functions or signals is greatest when the functions or signals are perfectly aligned, the magnitude of the ambiguity function is greatest when $\alpha=\tau$ and $\omega=\Omega$, or when the time delay or frequency offset between the two signals is removed.

Accordingly:

$$\max_{\alpha,\omega}|AF(\alpha,\omega)|=|AF(\tau,\Omega)| \quad (7)$$

Because of this property, the ambiguity function can be used in algorithms that seek to calculate the time delay and frequency offset between two signals by computing values of an estimated time delay and frequency offset that yield a maximum value of the ambiguity function. The maximum value can be used to find estimates of the actual time delay and actual frequency offset between the two signals.

A delay optimization function (DOF) can be defined as follows:

$$DOF(\alpha,\Delta)=\int_{-\infty}^{\infty}r_1^*(t,\Delta)r_2(t+\alpha,\Delta)dt \quad (8)$$

where $\Delta$ is a time lag and $r_1(t,\Delta)$ is the product of $s_1(t)$ and its complex conjugate $s_1^*$ evaluated at $(t+\Delta)$, or in other words, $r_1(t,\Delta)$ is the auto-product of $s_1(t)$ evaluated at $(t+\Delta)$, and is defined as:

$$r_1(t,\Delta)=s_1(t)s_1^*(t+\Delta) \quad (9)$$

and where $r_2(t,\Delta)$ is the auto-product of $s_2(t)$ and is defined as:

$$r_2(t,\Delta)=s_2(t)s_2^*(t+\Delta) \quad (10)$$

It must be understood that while the terminology in this document utilizes primarily $(t+\Delta)$, the equations herein are also valid and can be rewritten for the case when the value of $\Delta$ is subtracted, or delayed $(t-\Delta)$. With the delay optimization function defined in the above manner using $r_1(t,\Delta)$ and $r_2(t,\Delta)$, it can be proved that the magnitude of the delay optimization function is independent of the value of the actual frequency offset $\omega$ and peaks when $\alpha=\tau$. Because of these properties of the delay optimization function, the function can be used in algorithms that find the maximum value of the magnitude of the delay optimization function across a time interval of interest, calculate a value of a time delay, and then determine an estimate of the frequency offset using the time delay.

Proof:

Disregarding noise in the two signals $s_1(t)$ and $s_2(t)$ for the purposes of simplicity, Equation 1 can be substituted into Equation 9 to produce:

$$r_1(t,\Delta)=s_0(t)s_0^*(t+\Delta) \quad (11)$$

Equation 2 can also be substituted into Equation 10 to produce:

$$r_2(t,\Delta)=(s_0(t-\tau)e^{j\Omega t})(s_0((t+\Delta)-\tau)e^{j\Omega(t+\Delta)})^* \quad (12)$$
$$=s_0(t-\tau)s_0^*((t+\Delta)-\tau)e^{-j\Omega\Delta}$$

Substituting Equations 11 and 12 into their respective positions in the integrand of the delay optimization function of Equation 8 obtains the following:

$$r_1^*(t,\Delta)r_2(t+\alpha,\Delta)=[s_0(t)s_0^*(t+\Delta)]^* \times [s_0(t+(\alpha-\tau))s_0^*((t+\Delta)+(\alpha-\tau))e^{-j\Omega\Delta}] \quad (13)$$

Simplifying Equation 13 by substituting with Equation 14 yields:

$$f(t,\Delta)=s_0(t)s_0^*(t+\Delta) \quad (14)$$

$$r_1^*(t,\Delta)r_2(t+\alpha,\Delta)=f^*(t,\Delta)f(t+(\alpha-\tau),\Delta)e^{-j\Omega\Delta} \quad (15)$$

Substituting Equation 15 into Equation 8 and bringing the constant $e^{-j\Omega\Delta}$ out of the integral yields:

$$DOF(\alpha,\Delta)=e^{-j\Omega\Delta}\int_{-\infty}^{\infty}f^*(t,\Delta)f(t+(\alpha-\tau),\Delta)dt \quad (16)$$

The magnitude of Equation 16 can be expressed as:

$$|DOF(\alpha,\Delta)|=|\int_{-\infty}^{\infty}f^*(t,\Delta)f(t+(\alpha-\tau),\Delta)dt| \quad (17)$$

A property of Equation 17 is that for all values of $\alpha$ and $\tau$, the absolute value of the integral term will always be less than or equal to the value of an integral without the $(\alpha-\tau)$ term. Accordingly, expressed in the form of the Cauchy-Schwartz inequality:

$$|\int_{-\infty}^{\infty}f^*(t,\Delta)f(t+(\alpha-\tau)\Delta)dt|\leq\int_{-\infty}^{\infty}f^*(t,\Delta)f(t,\Delta)dt \quad (18)$$

and therefore:

$$|DOF(\alpha,\Delta)|\leq|DOF(\tau,\Delta)| \quad (19)$$

Done Proof

The relationship in Equations 18 and 19 is valid for any value of $\Delta$ and for any function used as $s_0(t)$. However, for Equations 18 and 19 to be useful, $\Delta$ needs to be large enough to prevent $|DOF(\alpha, \Delta)|$ from peaking at more than one value of $\alpha$ given the particular characteristics of the function used as $s_0(t)$. For the exemplary purposes of this disclosure, if $s_0(t)$ is a stationary random signal and $\Delta=0$, then statistically $|DOF(\alpha, \Delta)|$ integrated over time will be a constant value for any value of $\alpha$. While this is a mathematically sound conclusion, the result is not practically useful.

Accordingly, values of $\Delta$ may be selected that are large enough to ensure that $s_0(t)$ and $s_0(t+\Delta)$ exhibit minimal correlation. If $s_0(t)$ and $s_0(t+\Delta)$ are stationary random signals, the value of $\Delta$ may be selected to insure that the two signals are independent. In particular implementations of a system for calculating a time delay and a frequency offset, a method of determining a value of $\Delta$ may be included. The method may include the steps of receiving a $s_0(t)$ signal, determining the bandwidth value, and calculating a value of $\Delta$ using the bandwidth value. In particular implementations of the method, the bandwidth may be a double-sided bandwidth B or fractional bandwidth. Determining the bandwidth may include measuring the $s_0(t)$ signal and calculating the bandwidth visually or with a mathematical formula. Calculating a value of $\Delta$ with the bandwidth value may include inverting the bandwidth value (in the case of a double-sided bandwidth) or performing any other calculation with the bandwidth value that produces a meaningful value for $\Delta$.

For the exemplary purposes of this disclosure, if the bandwidth of $s_0(t)$ is a double-sided bandwidth B, then its autocorrelation may be relatively small and continue to decrease toward zero as $\Delta$ increases from the value of 1/B. For such a system, meaningful values of $\Delta$ exist as $\Delta$ is greater than or equal to 1/B.

The delay optimization function can also be defined in the digital domain as follows:

$$DOF(\alpha,\Delta)=\Sigma_{n=0}^{N-1}r_1^*(n,\Delta)r_2(n+\alpha,\Delta) \quad (20)$$

where N is the total number of samples, n is the nth sample, and $\alpha$ and $\Delta$ represent the estimated delay and time lag, respectively, expressed as a number of samples, and where $$r_1(n,\Delta)=s_1(n)s_1^*(n+\Delta) \quad (21)$$

and $$r_2(n,\Delta)=s_2(n)s_2^*(n+\Delta) \quad (22)$$

In the digital domain, the frequency offset $\Omega$ is calculated by normalizing the frequency F by the sampling rate $F_s$: $\Omega=2\pi(F/F_s)$. In the expressions that follow the normalized form of the frequency offset $\Omega$ is used.

Converting Equation 16 to digital form and using Equation 20 yields the following:

$$DOF(\alpha, \Delta) = \sum_{n=0}^{N-1} r_1^*(n, \Delta) r_2(n+\alpha, \Delta) \quad (20)$$

$$= e^{-j\Omega\Delta} \sum_{n=0}^{N-1} f^*(n, \Delta) f(n+(\alpha-\tau), \Delta) \quad (23)$$

When the time delay $\tau$ has been estimated, the frequency offset $\Omega$ in radians can be calculated by using Equation 23 and converting to polar form using the arg function:

$$\Omega = -\frac{1}{\Delta} \arg(DOF(\tau, \Delta)) \quad (24)$$

where $\tau$ has been substituted for the estimated time delay $\alpha$.

Theoretically, Equation 24 can be used for real, non-normalized frequency offsets as large as $\pm(0.5/\Delta)F_s$. Because of this, Equation 24's range of estimation increases as the value of $\Delta$ decreases. One of the properties of Equations 23 and 24 is that once the value of $\tau$ has been estimated, the value of the frequency offset can be computed directly. Because of this, algorithms that utilize various forms of Equations 23 and 24 in combination with Equations 21 and 22 can avoid employing two-way iterative techniques and compute the time delay and frequency offset directly using only single-way computations. In implementations of these algorithms, these properties of Equations 23 and 24 may allow reduction of computation time and/or resources when calculating values of the time delay and frequency offset.

Referring to FIG. 1A, an implementation of a delay optimization function is illustrated. The delay optimization function illustrated was generated from an simulated quadrature phase shift keyed (QPSK) signal generated by a pulse shaper with a 30% roll-off factor at eight samples per symbol. The impulse response length of the pulse shaper was twelve symbols. The signal-to-in-band noise ratio SINR, calculated as $E_s/N_o$, at the pulse shaper output was $-10$ dB. Because adjacent QPSK symbols are independent, $\Delta$ was selected to be one symbol, or 8 samples. While the noise in $s_2(t)$ had an SINR of $-10$ dB, the noise in $s_1(t)$ was assumed to be negligible, which is consistent with observed behavior in many applications. The accumulation length or total number of samples N was 2048 symbols. In the implementation of the delay optimization function illustrated in FIG. 1A, the frequency offset was one-third the symbol rate.

Figure 1B:
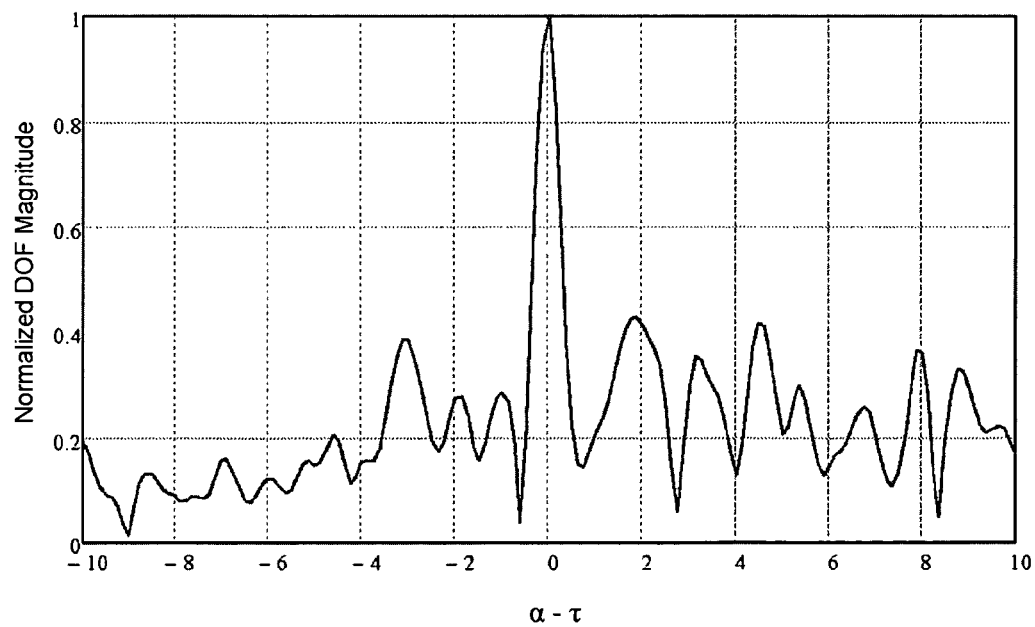
FIG. 1B is a graph of another implementation of a delay optimization function.

Referring to FIG. 1B, a second implementation of a delay optimization function is illustrated. While the same signal and system parameters were used to generate the second implementation, the frequency offset was one-quarter of the symbol rate. By inspection, the behavior of both of the implementations is similar. In both implementations, the magnitude of the delay optimization function dropped rapidly from its peak at $\alpha=\tau$ to the noise floor when a differs from the time delay $\tau$ by plus or minus one half symbol. In addition, both implementations peak at $\alpha=\tau$ despite the significant difference in frequency offset between the implementation shown in FIG. 1A and the implementation illustrated in FIG. 1B.

Also, the two implementations illustrate some of the robustness features of the delay optimization function since the SNIR was $-10$ dB for both.

Figure 2:
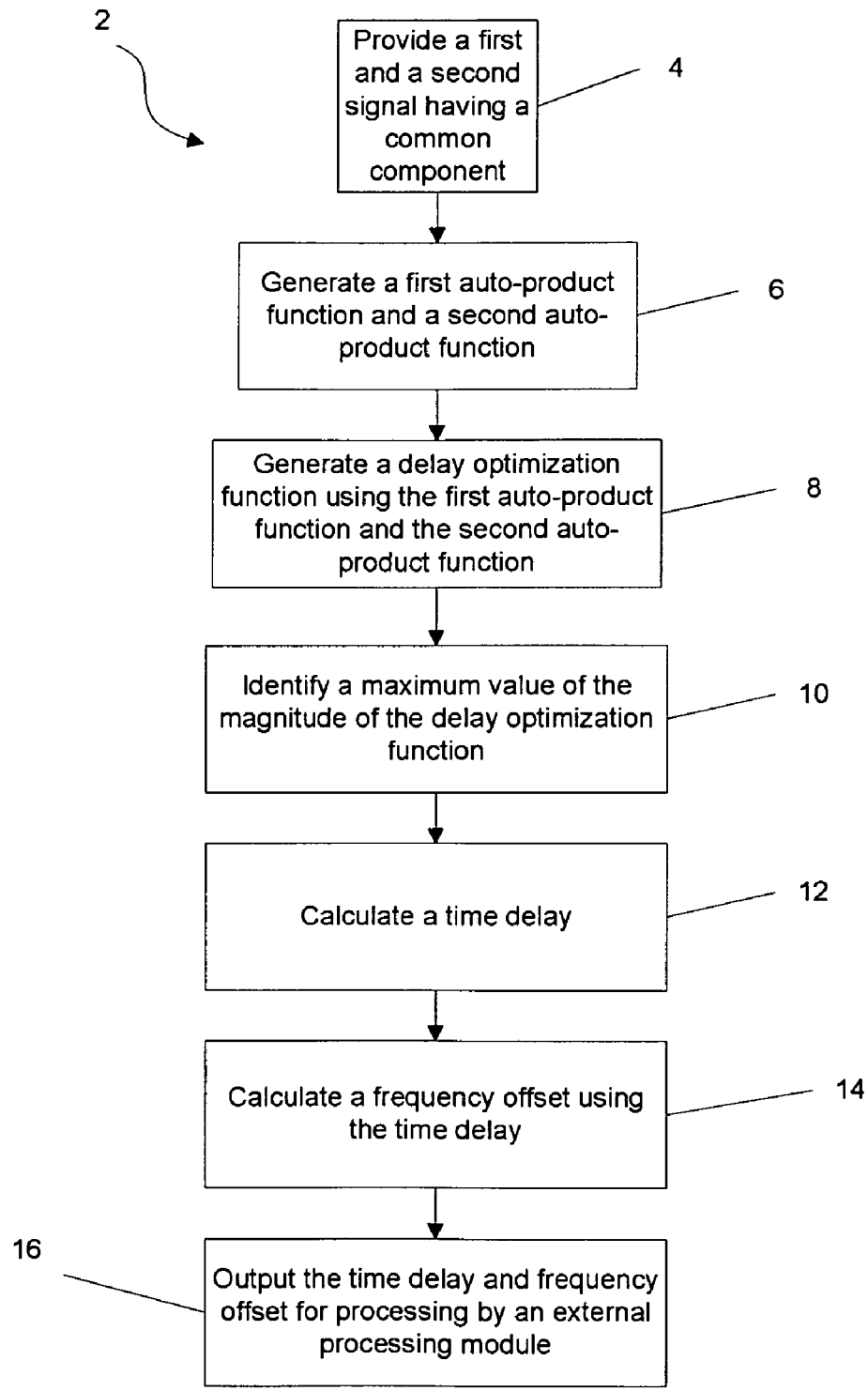
FIG. 2 is a flow diagram of an implementation of a method of calculating a time delay and frequency offset.

Implementations of methods and algorithms for calculating a time delay and frequency offset may utilize the delay optimization function equations derived as Equations 20-24 and Equation 14 to solve the ambiguity function in the digital domain. Referring to FIG. 2, Equations 14 and 20-24 may be used in method implementations 2 that include providing a first signal and a second signal that have a common component $s_0(t)$ (step 4). The second signal may be delayed in time, in frequency, or in both time and frequency relative to the first signal. The method may further include generating a first auto-product function and a second auto-product function using the first signal and the second signal and Equations 21 and 22 (step 6). Once the first and second auto-product functions have been generated, the method 2 may include generating a delay optimization function using the first and second auto-product functions and Equations 23 and 14 (step 8). The method may further include identifying a maximum value of the absolute value of the delay optimization function (step 10) and calculating a time delay $\tau$ (step 12). The method may also include calculating a frequency offset $\Omega$ using the time delay $\tau$ and Equation 24 (step 14). The resulting time delay and frequency offset may then be output for processing by an external processing module (step 16). The external processing module may be a single processing module or any number and/or combination of different processing modules.

Particular implementations of methods for calculating a time delay and frequency offset utilizing Equations 20-24 may include a number of other derivations, method operations, and/or method steps that give the implementations various features and characteristics. For the exemplary purposes of this disclosure, implementations of methods for calculating a time delay and frequency offset are disclosed that utilize various properties of Equations 20-24 and further derivations to produce method operations and steps that may increase the efficiency and speed of the calculations. Many other particular implementations utilizing Equations 21-24 that involve other derivations and method steps are possible.

A property of the cross-correlation of two periodic functions is that the discrete Fourier transform (DFT) of the cross-correlation is equivalent to the product of the individual discrete Fourier transforms of the two periodic functions:

$$z_n = \sum_{m=0}^{M-1} x^*(m) y(m+n) \quad (25)$$

where $Z_n$ is the cross-correlation of periodic functions $x_n$ and $y_n$ for a period of M samples and $n=0, 1, \ldots M-1$. Accordingly, $$Z_k = X_k^* Y_k \quad (26)$$

where $Z_k$ is the discrete Fourier transform of $z_n$, $X_k$ is the discrete Fourier transform of $x_n$, $Y_k$ is the discrete Fourier transform of $y_n$, and $k=0, 1, \ldots M-1$.

Taking the inverse discrete Fourier transform (IDFT) of $Z_k$ yields:

$$z_n = IDFT\{Z_k\} = \frac{\sum_{k=0}^{M-1} Z_k e^{j2\pi kn}}{M} \quad (27)$$

where $n=0, 1, \ldots M-1$.

Were Equation 25 used directly to calculate all M samples of $z_n$, it would require about $M^2$ complex multiplications to complete the computation. However, if Equations 26 and 27 are used (performing two discrete Fourier transforms and one inverse discrete Fourier transform), the total number of computations required may be:

$$3\left(\frac{M}{2}\right)\log_2(M) + M \qquad (28)$$

which may allow a substantial computational savings when M is large.

Periodic functions $x_n$ and $y_n$ may be derived from non-periodic functions $r_1(n,\Delta)$ and $r_2(n,\Delta)$ for use in Equations 19-21 using the following definitions and by substituting into Equation 25:

$$x_n = \begin{cases} r_1(n, \Delta), & n = 0, 1, \ldots N-1 \\ 0, & n = N, N+1, \ldots 2N-1 \end{cases} \qquad (29)$$

$$y_n = r_2(n, \Delta), n = 0, 1, \ldots 2N-1 \qquad (30)$$

$$z_n = \sum_{m=0}^{2N-1} x^*(m)y(m+n) = \sum_{m=0}^{N-1} r_1^*(m, \Delta)r_2(m+n, \Delta) \qquad (31)$$

where n=0, 1, . . . 2N−1.

Since, by definition, the values of $x_n$ are zero for values of n greater than N, and by substituting n for m and α for n in Equation 20, Equations 20 and 31 can be shown to be equivalent. Accordingly:

$$DOF(\alpha,\Delta) = \Sigma_{n=0}^{N-1} r_1^*(n,\Delta) r_2(n+\alpha,\Delta) = z_\alpha \qquad (32)$$

where α=0, 1, . . . N.

In particular implementations, the discrete Fourier transforms may be performed across segments of a relative time delay range D. There may be M of these segments or blocks used in any particular implementation, each equal in duration to a delay range of N samples. Since the size of the time delay range N may be arbitrarily selected, the number of blocks M can be calculated as follows (⌈x⌉ indicates the minimum integer no less than x):

$$M = \left\lceil \frac{L}{N} \right\rceil, L = DF_s \qquad (33)$$

where L is the total number of samples in the relative time delay range D, computed as $L = D \ast F_s$, where $F_s$ is the sampling rate. A frequency offset F may be within $\pm F_s/(2\Delta)$.

To summarize, implementations of methods and algorithms for calculating a time delay and frequency offset may utilize Equation 33 along with the following equations, utilizing given, selected, and/or calculated values of Δ, N, $F_s$, and D with frequencies in normalized form:

$$r_1(n, \Delta) = s_1(n)s_1^*(n+\Delta), n = 0, 1, \ldots N-1 \qquad (34)$$

$$r_2(n, \Delta) = s_2(n)s_2^*(n+\Delta), n = 0, 1, \ldots (M+1)N-1 \qquad (35)$$

$$X_k = \sum_{n=0}^{N-1} r_1(n, \Delta)e^{-j2\pi\frac{kn}{2N}}, k = 0, 1, \ldots 2N-1 \qquad (36)$$

$$Y_{m,k} = \sum_{n=0}^{2N-1} r_2(mN+n, \Delta)e^{-j2\pi\frac{kn}{2N}}, \qquad (37)$$

$$m = 0, 1, \ldots M-1, k = 0, 1, \ldots 2N-1$$

$$Z_{m,k} = X_k^* Y_{m,k}, m = 0, 1, \ldots M-1, k = 0, 1, \ldots 2N-1 \qquad (38)$$

$$z_{m,n} = \frac{1}{2N}\sum_{k=0}^{2N-1} Z_{m,k} e^{j2\pi\frac{kn}{2N}}, m = 0, 1, \ldots M-1, n = 0, 1, \ldots 2N-1 \qquad (39)$$

$$DOF(mN+\alpha, \Delta) = z_{m,\alpha}, m = 0, 1, \ldots M-1, \alpha = 0, 1, \ldots N \qquad (40)$$

$$|DOF(\tau, \Delta)|^2 = \max_{n=0,1,\ldots L-1} |DOF(n, \Delta)|^2 \qquad (41)$$

$$\Omega = -\frac{1}{\Delta}\arg(DOF(\tau, \Delta)) \qquad (42)$$

Figure 3:
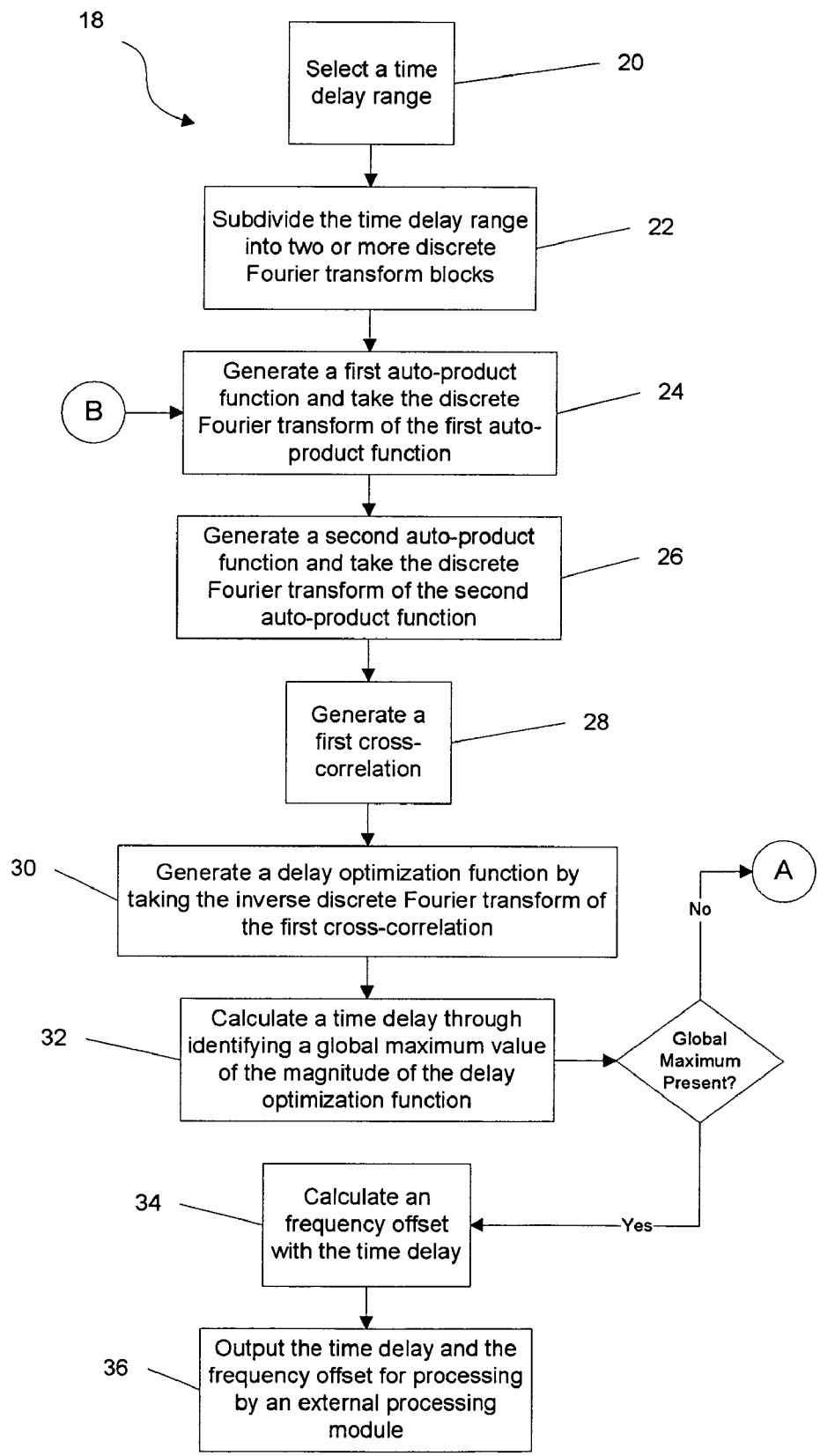
FIG. 3 is a flow diagram of another implementation of a method of calculating a time delay and frequency offset.
Figure 4:
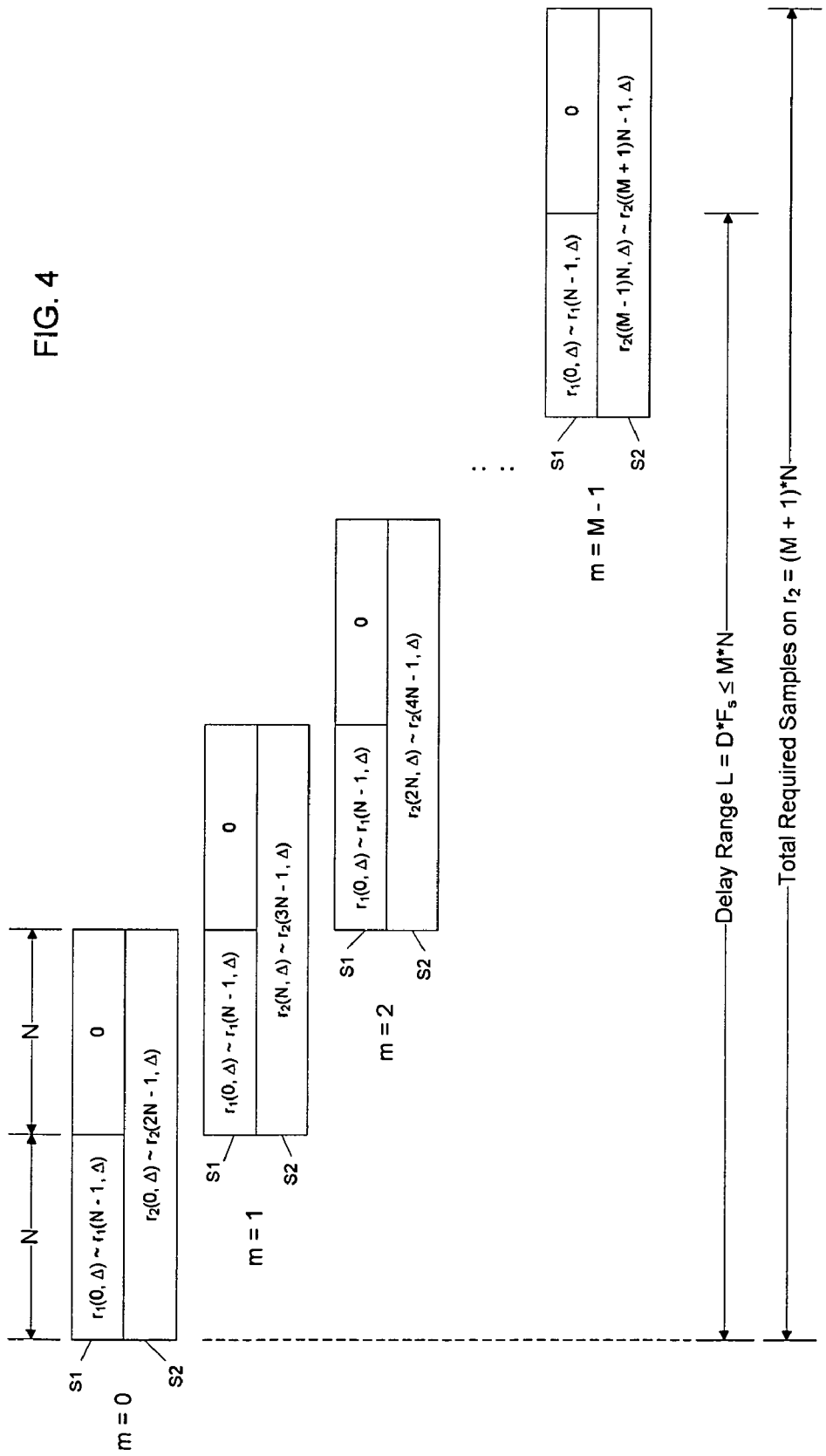
FIG. 4 is an illustration of the discrete Fourier transform blocks for a first signal S1 and for a second signal S2 during operation of an implementation of the method.

Referring to FIG. 3, an implementation of method for calculating a time delay and frequency offset 18 is illustrated. FIG. 4 is an illustration of the operation of the method illustrated in FIG. 3 across the time delay range. As illustrated, the method 18 may include selecting a time delay range (step 4). In particular implementations, the time delay range is a period of time representing a period of time between minimum and maximum time delay values. By non-limiting example, if the minimum time delay value is 150 milliseconds and the maximum time delay value is 250 milliseconds, a time delay range of 100 milliseconds could be selected. The method also includes subdividing the time delay range into two or more discrete Fourier transform blocks (step 22). The two or more discrete Fourier transform blocks may be N in duration (as indicated in FIG. 4). In particular implementations of the method, the blocks may all be of the same time duration (as illustrated in FIG. 4); in others, the blocks may be of varying time durations. FIG. 4 illustrates the operation of the method for two signals, a first signal (S1) and a second signal (S2). Here, the top most block corresponds to S1 and the block beneath it corresponds to S2; as can be observed from FIG. 4, the block corresponding to S1 is half the size of the block corresponding to S2.

Implementations of the method 18 may also include generating a first auto-product function and taking the discrete Fourier transform of that function (step 24) and generating a second auto-product function and taking its discrete Fourier transform (step 26). Implementations may use Equations 34 and 36 to generate the first auto-product function and take the discrete Fourier transform and may use Equations 35 and 37 to generate the second auto-product function and take its discrete Fourier transform. In implementations of the method and as illustrated in FIG. 4, the first auto-product function may be generated only once, while the second auto-product function may be generated M times. As the process of generating each second auto-product function is repeated, it can be visualized as sliding the block corresponding to S1 from left to right above each of the series of blocks corresponding to S2. In some implementations, only one second auto-product block may be formed. In others, multiple blocks may be processed.

With each set of discrete Fourier transformed first and second auto-product functions, implementations of the method 18 generate a first cross-correlation (step 28). Particular implementations may utilize Equation 38 to generate the first cross-correlation and any subsequent cross-correlations. As illustrated in FIG. 4, because the discrete Fourier transform for the first auto-product function is taken over an interval only half the size of the one corresponding to the second auto-product function, the remaining portion of the interval is set equal to zero to enable the taking of the first cross-correlation. Implementations of the method 18 then generate a delay optimization function by taking the inverse discrete Fourier transform of the first cross-correlation (step 30). Implementations may utilize Equations 39 and 40 to generate the delay optimization function. As illustrated in FIG. 4, in particular implementations of the method 18, steps 26, 28, and 30 may be repeated for each of the 2N discrete Fourier transform blocks corresponding to S2. When steps 26, 28, and 30 are repeated, the delay optimization function over the entire time delay may be generated by combining the results of each repetition. As indicated on FIG. 4 by the end of the line indicating the size of the delay range, the number of blocks that can be processed is actually MN rather than (M+1)N because of the size of the block corresponding to S1.

In addition, while in FIG. 4 the size of the block corresponding to S1 is N and the size of the block corresponding to the second auto-product function is 2N, other implementations of the method may utilize blocks sized according to any other ratio between the two block sizes. For example, if the size of the first auto-product block was reduced to N/2, then two cross-correlations between the first and second auto product functions could be constructed for each discrete Fourier transform block corresponding with S2. Such an implementation, however, may suffer from a reduction in the signal-to-noise level resolution because of the reduction in the block size corresponding to S1 relative to the block size corresponding to S2.

Implementations of the method 18 then take the generated delay optimization function and calculate a series of values of the magnitude of the delay optimization function (step 32). In particular implementations, Equation 41 may be utilized to generate squared values of magnitude of the delay optimization function across the time delay range D. FIGS. 1A and 1B illustrate exemplary values of the magnitude of the delay optimization function plotted against values of $\alpha$-$\tau$. Implementations of the method may utilize any values of the delay optimization function (whether, by non-limiting example, absolute values, magnitudes, squared absolute values, or any other values generated using the delay optimization function) to identify a global maximum value of the magnitude of the delay optimization function.

As has been previously discussed, the delay optimization function has the property that its global maximum value of the function will occur when $\alpha=\tau$, or when a time value within the time delay range D includes the time delay between the two signals S1 and S2. The foregoing statement is true provided that the noise level present in signals S1 and S2 is not so high that the value of their cross-correlation is not discernable from the noise. When this is the case, a global maximum value of the magnitude of the delay optimization function may not be large enough to be reliably distinguished from the background noise across the time delay range D. However, if a global maximum value of the magnitude of the delay optimization function can be identified, a frequency offset can be calculated using the time delay identified from the maximum value of the magnitude of the delay optimization function (step 34). Equation 42 may be used in particular implementations to calculate the frequency offset between the two signals S1 and S2.

Once the time delay and frequency offset have been calculated, implementations of the method 18 may output them for processing by an external processing module (step 36). External processing modules may include, by non-limiting example, a logic circuit, a microprocessor, a random access memory (RAM), an electronically programmable read-only memory (EPROM), a display, a satellite signal control module, a radar gun, a cellular base station, or any other electronic device, circuit, or system capable of storing, processing, and/or using the time delay and frequency offset.

Figure 6:
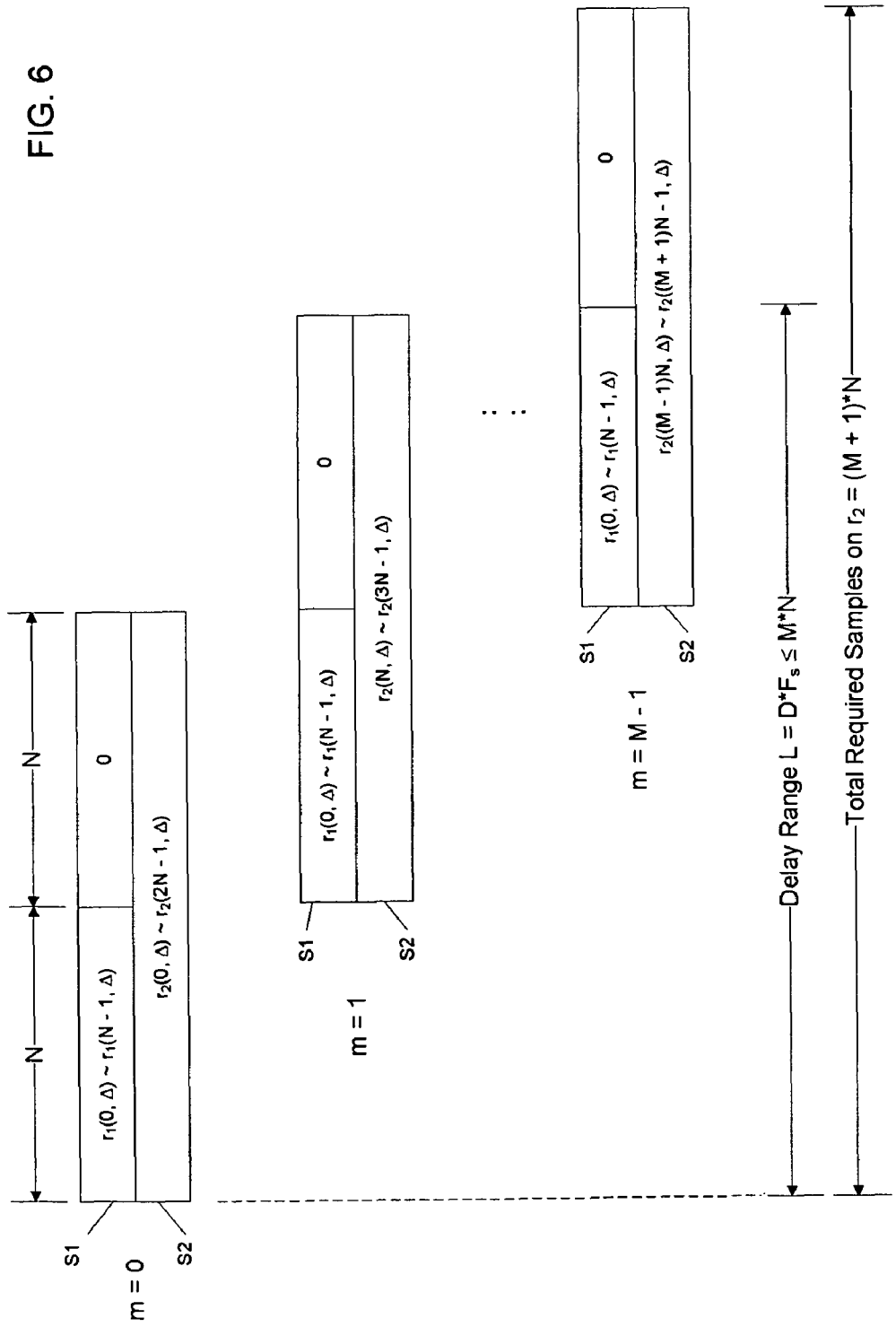
FIG. 6 is an illustration of the discrete Fourier transform blocks for a first signal S1 and for a second signal S2 during operation of an implementation of the method, where the discrete Fourier transform blocks are wider in time than the discrete Fourier transform blocks illustrated in FIG. 4.

When no global maximum value of the delay optimization function can be found, implementations of the method of calculating a time delay and frequency offset 18 may utilize additional steps. In the case when the time delay range may not actually include the value of the time delay between the first signal and the second signal, selection of a new time delay range may be performed and the method 18 performed over that new range. To deal with situations where noise levels in the first and second signals are too high and referring to FIG. 7, an implementation of a method of increasing the sensitivity of a method of calculating a time delay and frequency offset 38 may be utilized. The method 38 includes subdividing the time delay range into two or more subsequent discrete Fourier transform blocks for the first signal and for the second signal that are longer in time than the previous discrete Fourier transform blocks (step 40). FIG. 6 illustrates subsequent discrete Fourier transform blocks corresponding with S1 and S2 longer in time than the discrete Fourier transform blocks illustrated in FIG. 4.

Theoretically, when the duration of the blocks (or duration of 2N) is doubled, the signal-to-noise ratio of a system implementing the method 18 may be increased by 3 dB. Because each of the discrete Fourier transform blocks is longer, the required processing time per block of a system implementing the method may increase. However, since the number of blocks has been reduced by half, the actual increase in total system processing time may not significantly increase (or may even be reduced in some implementations). Also, in particular implementations of the method, the blocks may all be of the same time duration (as illustrated in FIGS. 4 and 6); in others, the blocks may be of varying time durations. Once the subsequent discrete Fourier transform blocks have been created, steps 24 through 32 may be repeated. If a global maximum value of the delay optimization function can now be identified, a time delay and frequency offset will be calculated. If not, step 40 and steps 24-32 may be repeated one or more additional times or a new time delay range value selected.

An additional factor governing the length to be selected for the discrete Fourier transform blocks is the number of symbols being transmitted by the first and second signals. For example, in implementations of the method processing 16 QAM (quadrature amplitude modulated) signals rather than 8 QAM or 8 PSK (phase shift keyed) signals, the duration of each block may need to be increased to ensure a global maximum value of the magnitude of the total delay optimization function results. Without being bound by any theory, this may be because the amount of variance in the 16 QAM signal is greater than in an 8 QAM or 8 PSK signal. Implementations of methods for calculating a time delay and frequency offset may include various preselected values of N depending upon the number of symbols being transmitted by the signals to be processed, or may include various iterative techniques to aid in converging to optimal values of N.

Figure 5:
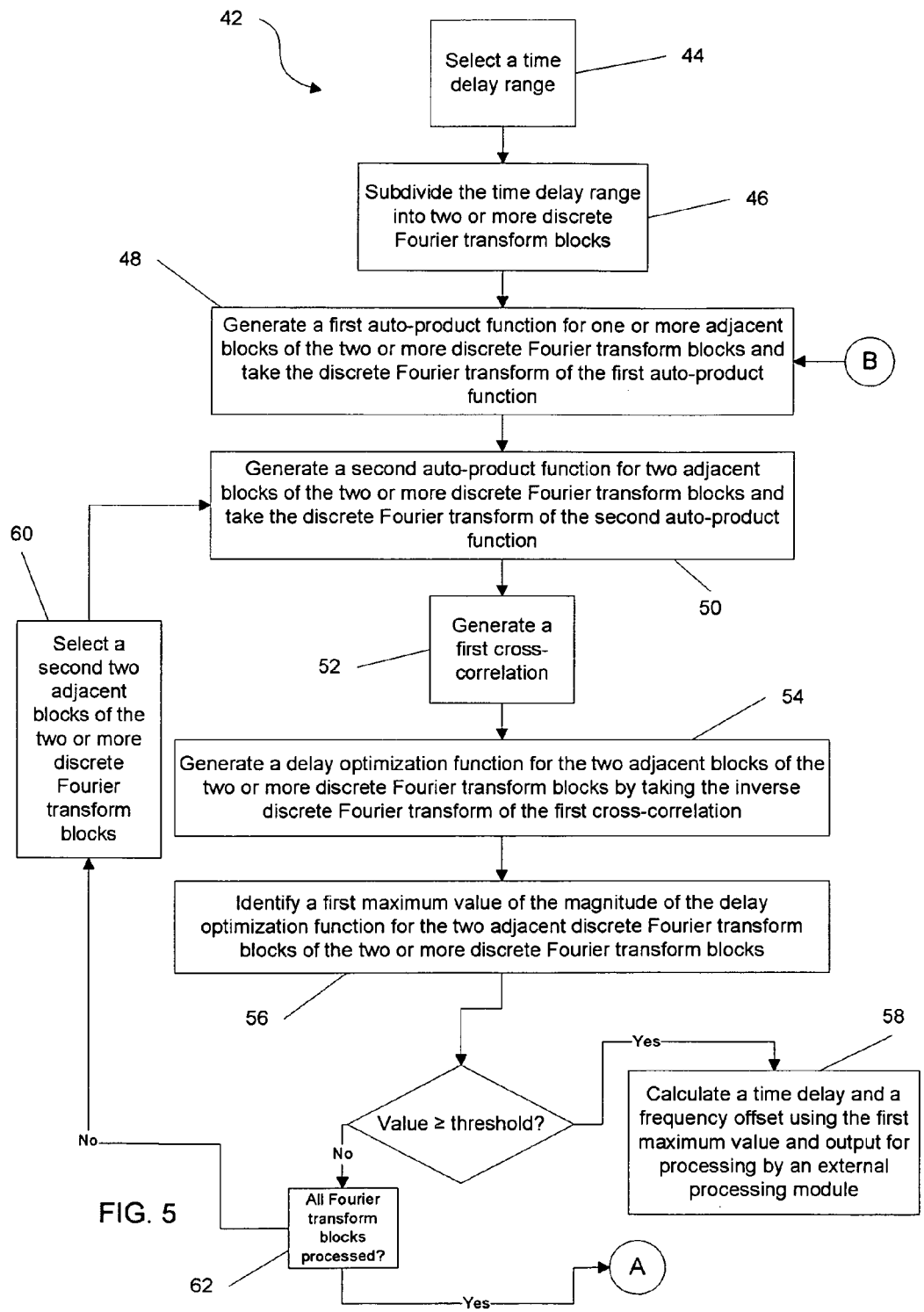
FIG. 5 is a flow diagram of another implementation of a method of calculating a time delay and frequency offset.

Referring to FIG. 5, another implementation of a method of calculating a time delay and frequency offset 42 is illustrated. As illustrated, this method 42 includes elements similar to the previously discussed method, along with selecting a time delay range (step 44). The method 42 may also include subdividing the time delay range into two or more discrete Fourier transform blocks (step 46). The method 42 includes generating a first auto-product function for two adjacent blocks of the two or more discrete Fourier transform blocks and taking the discrete Fourier transform of the first auto-product function (step 48). The method also includes generating a second auto-product function for two adjacent blocks of the two or more discrete Fourier transform blocks and taking the discrete Fourier transform of the second auto-product function (step 50). The method includes generating a first cross-correlation (step 52) and generating a delay optimization function for the two adjacent blocks of the two or more discrete Fourier transform blocks by taking the inverse discrete Fourier transform of the first cross-correlation (step 54).

Once the delay optimization function for the two adjacent blocks has been generated, the method includes identifying a first maximum value of the magnitude of the delay optimization function for the two adjacent Fourier transform blocks (step 56). As was discussed previously, the maximum value of the magnitude of the delay optimization function could be any of a wide variety of measures of the value of the delay optimization function, including absolute values squared. At this point, the method includes an evaluation whether the first maximum value of the delay optimization function is greater than a predetermined or calculated threshold. Since the global maximum value of the delay optimization function corresponds with an estimate of the time delay, use of a threshold may allow implementations of the method 42 to evaluate whether the global maximum has been reached as each of the adjacent Fourier transform blocks is being processed. The threshold may allow systems implementing the method 42 to avoid the computations required to process all of the discrete Fourier transform blocks before attempting to identify the global maximum value of its magnitude. Accordingly, if the first maximum value of the magnitude of the delay optimization function for the two adjacent discrete Fourier transform blocks is equal to or greater than the threshold, then implementations of the method 42 will calculate a time delay and a frequency offset using that value and output the time delay and frequency offset for processing by an external processing module (step 58).

However, if the first maximum value is less than the threshold, then implementations of the method 42 will determine whether all of the two or more discrete Fourier transform blocks have been processed by the method. If they have not, then the method includes selecting a second two adjacent blocks of the two more Fourier transform blocks adjacent to the first two adjacent blocks corresponding with S2 and repeating steps 50-56. If the first maximum value of the resulting delay optimization function is greater than or equal to the threshold, then the method includes calculating the time delay and frequency offset (step 58). If not, then implementations of the method 42 will continue selecting pairs of adjacent blocks and repeating steps 50-56 for the blocks corresponding to the second signal S2 until the threshold is equaled or exceeded or all of the two or more Fourier transform blocks have been processed (see FIGS. 4 and 6).

Figure 7:
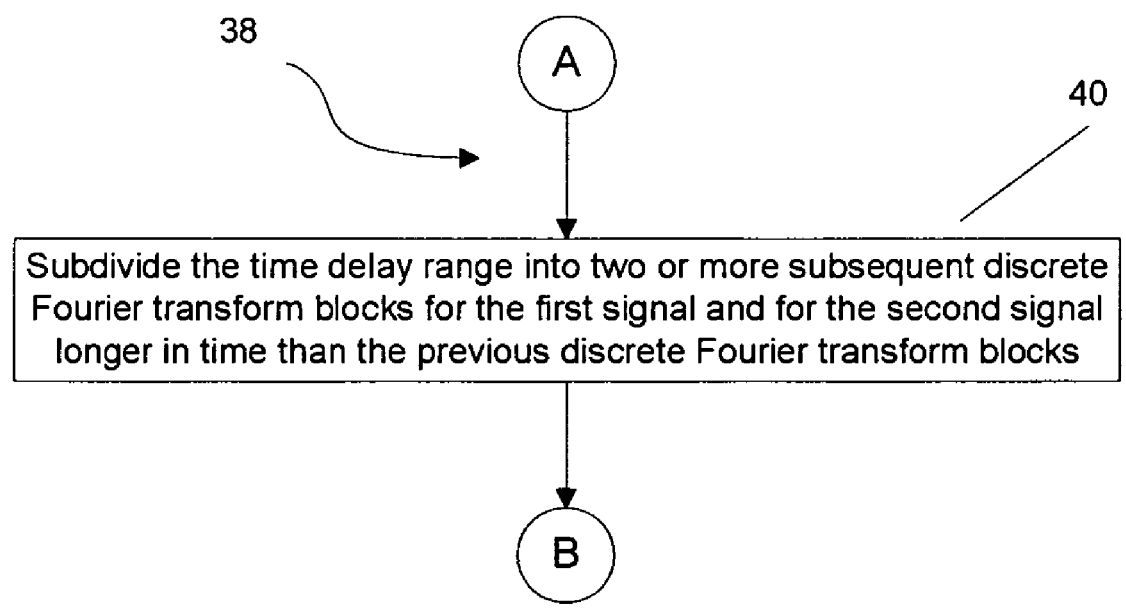
FIG. 7 is a flow diagram of a method of handling noise when calculating a time delay and frequency offset.

Once all of the two or more Fourier transform blocks have been processed without any one of the first maximum values equaling or exceeding the threshold, another value of the time delay range may be selected and the method 42 re-executed, or the method 42 may utilize an implementation of a method of increasing the sensitivity of a method of calculating a time delay and frequency offset 38. As was previously discussed, an implementation of such a method is illustrated in FIG. 7. Provided that the value of the threshold is properly determined either by trial-and-error, calculation, or inspection, if none of the first maximum values provides a result, it may be that the noise levels in the first and second signals are too high. Accordingly, after the method of increasing the sensitivity 38 is used, steps 48 through 56 and 58 or 60 may be repeated one or more times as indicated by the re-entry point B until one of the first maximum values of the magnitude of the delay optimization function for one of the two adjacent discrete Fourier transform blocks meets or exceeds the threshold value. Since the size of N has increased, the block corresponding with S1 must be recalculated if the signal-to-noise ratio between the two signals is to be improved.

The threshold used in implementations of the method 42 illustrated in FIG. 5 may be predetermined based on prior historical knowledge of the amount of noise in the first and second signals. Alternatively, the threshold may be determined by a trial-and-error approach. In other implementations, the threshold may be calculated using historical noise level information. In others, the threshold may be dynamically calculated as a percentage or fraction of the noise level present in the delay optimization function magnitude data. In such implementations, variations in the amount of noise in the channel can be handled immediately by utilizing either a predetermined or calculated percentage level. A wide variety of criteria may be used to determine the threshold or the percentage of error to be used as the threshold, including, by non-limiting example, statistical, ad-hoc, trial-and-error, modeled, theoretical, and any other method or technique of assessing a signal-to-noise ratio.

In implementations of the method 42 like those illustrated in FIG. 5, Equations 33-42 may be utilized in implementations of the method 42 in those steps that correspond with similar steps described in the previous method 18, except that the delay optimization function may be specifically generated for each pair of blocks and not as a combined delay optimization function for all discrete Fourier transform blocks across the time delay range D.

Implementations of methods of calculating a time delay and frequency offset 2, 18, and 42 may be utilized by a wide variety of systems. A number of examples of systems utilizing implementations of the methods disclosed in this document will be discussed for the exemplary purposes of this disclosure. Many other systems are possible, and those of ordinary skill in the art will readily be able to adapt the principles disclosed in this document to other systems.

Figure 8:
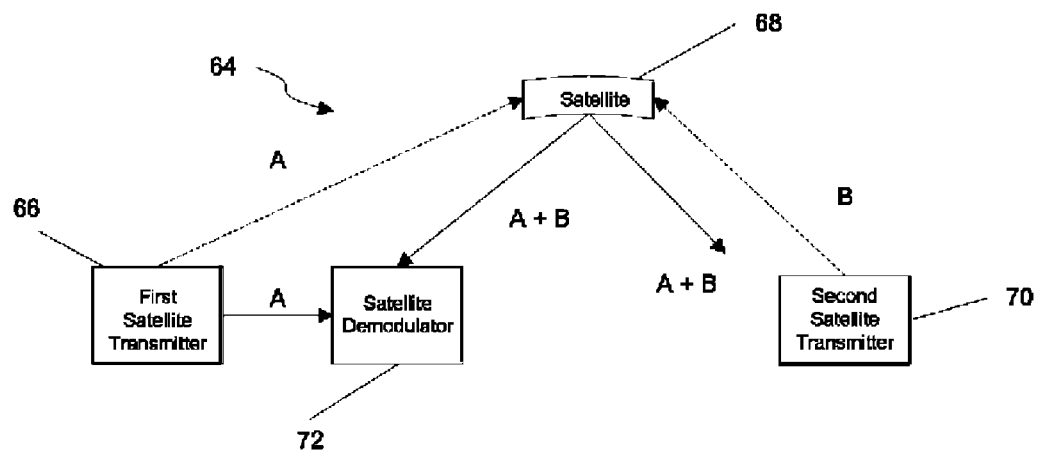
FIG. 8 is a block diagram of a carrier-in-carrier satellite communication system that utilizes an implementation of a method of calculating a time delay and frequency offset.

Referring to FIG. 8, an implementation of a satellite carrier-in-carrier communication system 64 is illustrated. The "carrier-in-carrier" aspect of the system refers to the system's 64 ability to transmit in full duplex two signals using only the bandwidth requirement of one of the signals. This is accomplished by a first satellite transmitter 66 transmitting a first signal A to a satellite 68. At the same time, a second satellite transmitter 70, to which the first satellite transmitter 66 is directing the first signal S1, is transmitting a second signal B to the satellite 68. Ordinarily, since the first signal A and second signal B are different signals, they would require transmission using two separate channels. However, in the implementation illustrated in FIG. 8, the satellite 68 is configured to receive the first signal A and second signal B, combine the first signal A and the second signal B, and transmit a combined signal A+B on a single channel to a satellite demodulator 72. Because the first signal A and second signal B are summed in the time domain [i.e., the two waveforms of the first signal S1 and second signal S2 have been summed to produce a composite signal], the satellite demodulator 72 must be able to filter out the copy of the first signal A that was sent to the satellite 68 to retrieve the second signal B. Accordingly, as the first satellite transmitter 66 is transmitting the first signal A to the satellite 68, the first satellite transmitter 66 is also sending a local copy of the transmitted first signal A to the satellite demodulator 72 coupled to the first satellite transmitter 66.

While the satellite demodulator 72 now has a copy of the first signal A sent to the satellite, for the satellite demodulator 72 to filter the first signal A from the incoming combined signal A+B by adjusting the amplitude or phase shift of the combined signal A+B to produce just the second signal B, the time delay and frequency offset between the received first signal A in the combined signal A+B and the local copy of the first signal A received must be determined. With these values, the satellite demodulator 72 will then be able to cancel the first signal A from the combined signal A+B symbol by symbol using various processing operations and module, leaving just the desired signal B to be further demodulated. Implementations of methods of calculating the time delay and frequency offset 2, 18, and 42 disclosed in this document may be incorporated in, by non-limiting example, the satellite demodulator 72, the first satellite transmitter 66, a stand-alone device, a logic circuit, a microprocessor, a circuit board, a computer, or any other electronic processing system coupled with the satellite demodulator 72.

When implementations of methods 2, 18, and 42 are utilized, they may be used to calculate the time delay and frequency offset one or more times. For implementations utilizing the methods 2, 18, and 42 in satellite carrier-in-carrier communication systems 64, they may be utilized only once to aid the systems 64 in establishing an initial connection with the satellite 68. Once the time delay and frequency offset values have been utilized, the system may include another real-time calculation module or component that continuously monitors the time delay and frequency offset of the incoming and transmitted signals. In other implementations, the methods 2, 18, and 42 may be utilized periodically or continuously to update and/or track the values of the time delay and/or frequency offset.

Because the satellite 68 is generally geostationary in implementations of carrier-in-carrier communication systems 64, the value of the time delay may not change significantly over time. Accordingly, the last time delay or a predetermined or calculated time delay between the satellite demodulator 72 and the satellite 68 may be used as the value of D. Alternatively, D may be estimated by knowing the location of and inclination of the orbit of the particular satellite being communicated with. Provided the value of $\Delta$ is sufficiently large (one symbol apart is usually sufficient) and that the number of discrete Fourier transform blocks 2N provides sufficient sensitivity, a refined estimate of the time delay and frequency offset can be obtained using implementations of the methods 2, 18, and 42. Implementations of carrier-in-carrier communications systems 64 may utilize this time delay and frequency offset, and/or may include additional time delay and frequency offset monitoring, calculating, and/or processing methods and/or modules.

Figure 9:
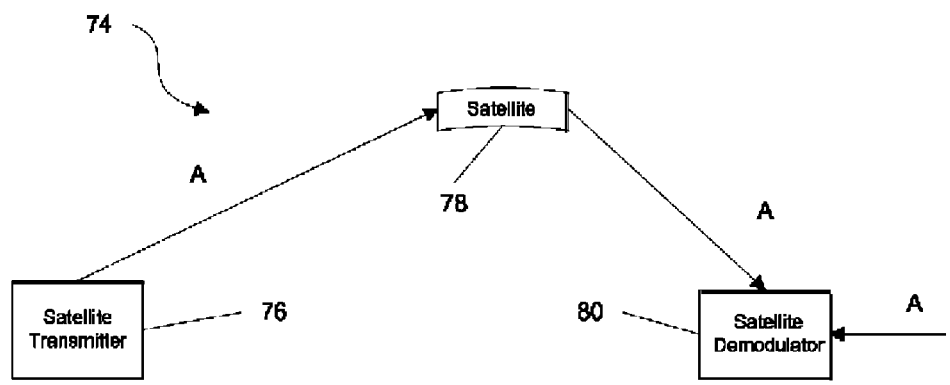
FIG. 9 is a block diagram of a burst transmission satellite communication system that utilizes an implementation of a method of calculating a time delay and frequency offset to detect when a desired signal has arrived.

Referring to FIG. 9, an implementation of a burst transmission satellite system 74 is illustrated. In burst transmission satellite systems, signals are sent that include a preamble at the beginning of the signal that is configured to alert the receiver that the signal is, by non-limiting example, from a particular source, should be routed to a particular receiver, contains specific data, or any other criteria useful for discriminating between different transmitted signals. Because burst transmission satellite systems involve signals sent in burst form, the receiver of such a burst signal may be required to rapidly process the preamble to determine what to do with the received signal. For example, the receiver may use the preamble to determine whether to continue receiving the incoming signal or not.

FIG. 9 illustrates a satellite transmitter 76 sending a burst transmission A containing a preamble to a satellite demodulator 80 via satellite 78. In order for the satellite demodulator 80 to determine what to do with the burst transmission A, it must have a local copy A of the preamble, or a desired signal, supplied to it. Since the preamble, or desired signal, is composed of symbols, it is a signal that can be used to compare with the signal of the incoming burst transmission to determine if the preamble of the burst transmission matches. Implementations of methods of calculating a time delay and frequency offset 2, 18, and 42 may be utilized in burst transmission satellite systems 74 to aid in determining whether the preamble of the incoming burst transmission matches a desired preamble. In such implementations, the time delay and frequency offset between the desired and received preambles may not actually be calculated, but the steps forming and processing discrete Fourier transform blocks (steps 50-56, for example) corresponding to the incoming signal (the second signal) may run continuously until the method identifies a global maximum value of the magnitude of the delay optimization function. At this point, the burst transmission A corresponds with the desired preamble. Accordingly, the satellite demodulator 80 of the burst transmission satellite system 74 will be able to receive, route, or otherwise use the incoming burst transmission A.

Because of the speed at which implementations of methods of calculating a time delay and frequency offset 2, 18, and 42 may be able to identify a global maximum value of the delay optimization function, implementations of burst transmission satellite systems 74 may be able to continuously process multiple burst transmissions with preambles of relatively few symbols or short time duration. In addition, the satellite demodulator 80 may also be able to compare a burst transmission to multiple desired preambles, may be able to compare multiple burst transmissions with a single preamble, or be able to compare multiple preambles with multiple burst transmissions. As a result, the satellite demodulator 80, either individually, or in combination with other external processing modules, may be able to act as a router of burst transmission signals, directing them to various destinations, which may include one or more external processing modules corresponding with the transmission.

Figure 10:
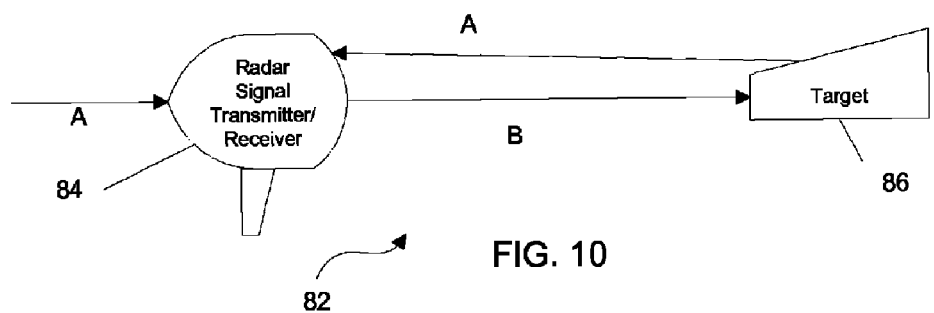
FIG. 10 is a block diagram of a radar gun system that utilizes an implementation of a method of calculating a time delay and frequency offset.

Referring to FIG. 10, an implementation of a radar gun system 82 is illustrated. As illustrated, the radar gun system 82 may include a radar signal transmitter/receiver 84 that sends out a radar signal A toward a target 86 and receives a reflected copy of the radar signal B. Because the copy of the radar signal B received by the radar signal transmitter/receiver 84 is reflected, it will be shifted in time and may be shifted in frequency from the original radar signal A initially sent. Accordingly, implementations of methods of calculating a time delay and frequency offset 2, 18, and 42 may be used in implementations of radar gun systems 82 to calculate the time delay and frequency offset of the reflected copy of the radar signal S1. When the time delay and frequency offset are received by external processing units within the radar gun system 82 after being calculated and outputted by the method implementations, the radar gun system 82 may be able to determine the distance between the radar gun system 82 and/or the speed of the target 86 relative to the radar gun system 82.

Figure 11:
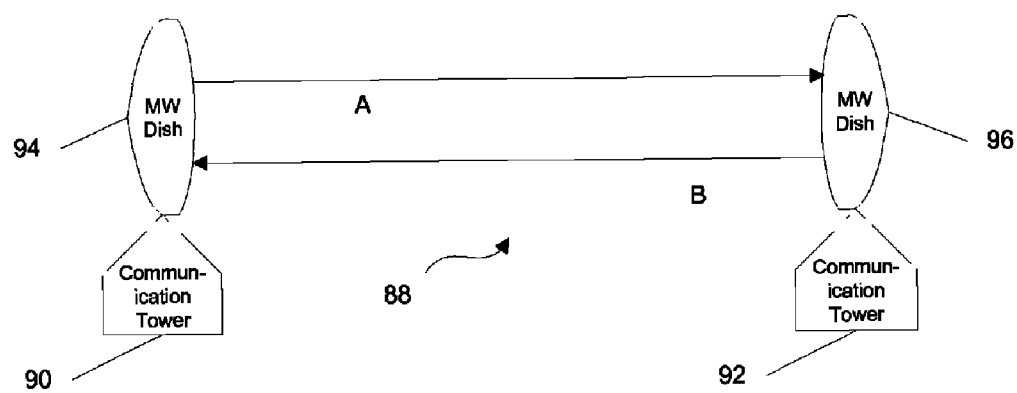
FIG. 11 is a block diagram of a microwave communication system that utilizes an implementation of a method of calculating a time delay and frequency offset.

Referring to FIG. 11, an implementation of a microwave telecommunication system 88 is illustrated. Implementations of microwave telecommunication systems 88 may include multiple communication towers 90, 92, each with a microwave dish 94, 96, respectively, coupled to them. Because the communication towers 90, 92 may be located many miles apart, while the communication towers 90, 92 are being initially setup after construction and after adjustments/repairs have been made to the communication towers 90, 92 and/or the microwave dishes 94, 96, knowledge of the time delay (and potentially, the frequency offset) between the two communication towers 90, 92 may be very useful.

Implementations of microwave telecommunication systems 88 may utilize implementations of methods of calculating a time delay and frequency offset 2, 18, and 42 by sending a test signal A between communication tower 90 to communication tower 92, and then resending the test signal B from communication tower 92 to communication tower 90. Because the resent test signal B will be delayed in time relative to the initially sent test signal A, implementations of methods 2, 18, and 42 can be used to calculate a time delay which can be used by external processing modules of the microwave telecommunications systems 88 to calculate the distance between the two communication towers 90, 92. Because of this, initial configurations and/or recovery after repairs and realignments of components of the microwave telecommunication system 88 may be more rapidly and accurately completed.

Figure 12:
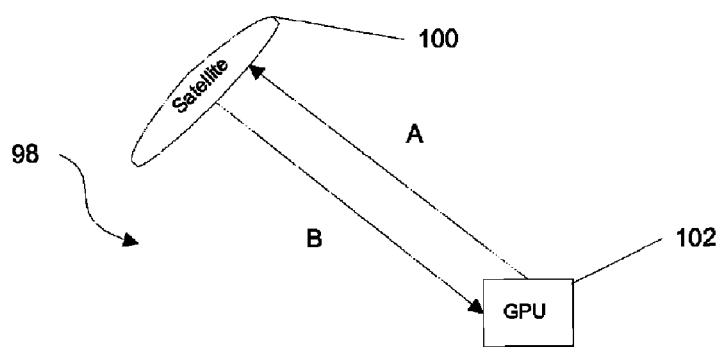
FIG. 12 is a block diagram of a global positioning system (GPS) that utilizes an implementation of a method of calculating a time delay and frequency offset.

Referring to FIG. 12, an implementation of a global positioning system 98 is illustrated. As illustrated, the global positioning system 98 may include a satellite 100 in communication with a global positioning unit 102. The global positioning unit 102 could be, by non-limiting example, coupled with a vehicle, an aircraft, coupled with a person, on a ship, coupled with another satellite, on the ground, or coupled with any other surface or object capable of being associated with the global positioning unit 102. To aid in tracking the position of the global positioning unit 102, the satellite 100 may send a tracking signal A to the global positioning unit 102. The global positioning unit 102 may then transmit a corresponding return tracking signal B to the satellite 100. In other implementations, the tracking signal A may be sent from the global positioning unit 102 to the satellite 100. Implementations of methods of calculating a time delay and frequency offset 2, 18, and 42 may be utilized by the satellite 100 and/or the global positioning unit 102 to determine the time delay and frequency offset or Doppler shift between the return tracking signal B and the tracking signal A. The time delay and frequency offset output by the method implementations may be used in various external processing modules to determine the distance between and/or change in distance or location of the global positioning unit 102 as well as its speed and direction relative to the satellite 100 and/or the ground or other reference point.

Figure 13:
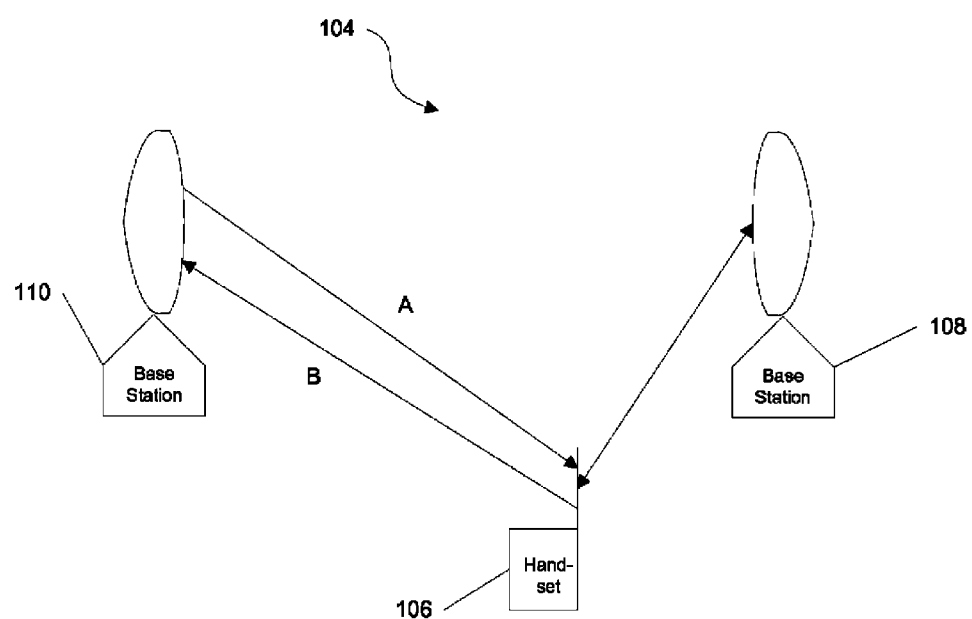
FIG. 13 is a block diagram of a cellular telephone communication system that utilizes an implementation of a method of calculating a time delay and frequency offset.

Referring to FIG. 13, an implementation of a cellular telephone communication network 104 is illustrated. The network 104 includes cellular base stations 108, 110 to which cellular handset 106 is in wireless communication. When the cellular handset 106 is moving relative to the base station 108 which it is connected to during a call, the base station 108 monitors the cellular handset's 106 position and corrects for frequency offsets arising from the motion of the cellular handset 106. When the cellular handset 106 has traveled a sufficient distance away from the base station 108, the network 104 will need to transfer the connection between the base station 108 and the cellular handset to a base station 110 closer to the cellular handset 106. This situation may occur when a caller is utilizing the cellular handset 106 while traveling in a vehicle and the need to switch from base station to base station must happen quickly to minimize disruption in the signal continuity between the cellular handset 106 and the base station 110.

Accordingly, implementations of cellular telephone communication networks 104 may utilize implementations of methods of calculating a time delay and frequency offset 2, 18, and 42 by sending a locating signal A from the base station 110 to the cellular handset 106. The cellular handset 106 receives the locating signal A and sends a copy of the locating signal B back to the base station 110. When the base station 110 receives the copy of the locating signal B, the base station can then calculate the time delay between the cellular handset 106 and the base station 110 as well as the frequency offset induced by the motion of the cellular handset 106 relative to the base station 110. Because implementations of the methods 2, 18, and 42 may be able to rapidly determine the time delays and frequency offsets and send them to relevant external processing modules for use, the base station 110 may be able to quickly begin receiving and transmitting signals originating from the cellular handset 106 using the time delays and frequency offsets calculated and therefore allow the cellular handset to quickly transfer its connection from base station 108 to base station 110.

Figure 14:
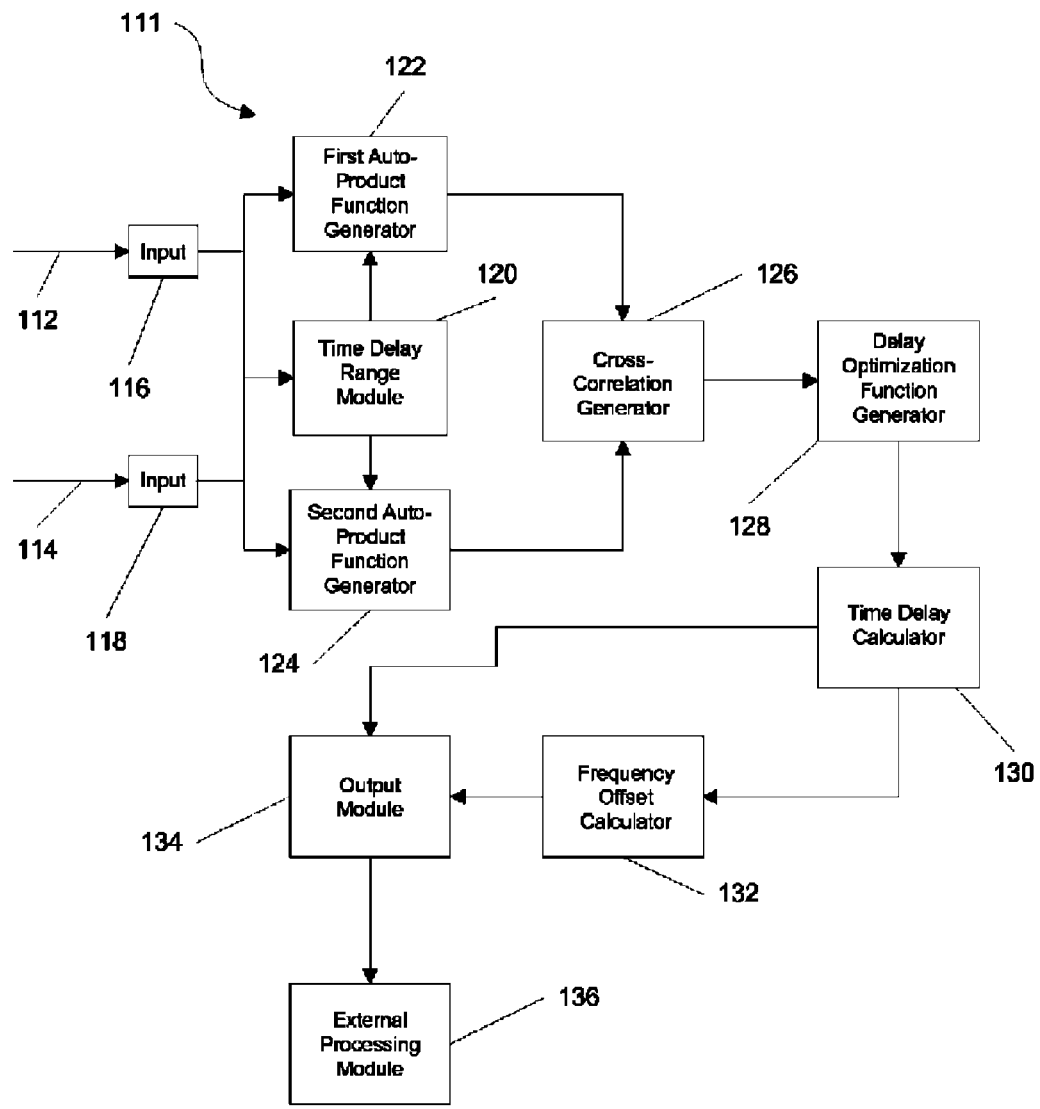
FIG. 14 is a block diagram of an implementation of a system for calculating a time delay and frequency offset.

Referring to FIG. 14, an implementation of a system for calculating a time delay and frequency offset 111 is illustrated. Implementations of systems for calculating a time delay and frequency offset 111 may be incorporated in any of the previously described system implementations as a module, component, or integral part and may be used exclusively or partially in calculating the time delay and frequency offset used by the system implementations. In addition, the methods 2, 18, and 42 may be implemented in a computer, in software incorporated into computer readable media, or as software implemented in a computer on computer readable media.

As illustrated, the system 111 includes two inputs 116, 118 configured to receive a first signal 112 and a second signal 114, respectively. In particular implementations of the system 111, there may be only one or a plurality of inputs. Input 116 is coupled with a first auto-product function generator 122 which is configured to generate a first auto-product function using the first signal 112 and to take the discrete Fourier transform of the resulting first auto-product function. Input 118 is coupled with a second auto-product function generator 124 which is configured to generate a second auto-product function using the second signal 114 and to take the discrete Fourier transform of the resulting second auto-product function. In addition, inputs 116, 118 are coupled with a time delay range module 120 that is configured to calculate a time delay range for the first signal 112 and for the second signal 114 as well as one or more discrete Fourier transform blocks.

The first auto-product function generator 122 and the second auto-product function generator 124 are coupled with a cross-correlation generator 126 which is configured to generate a first cross-correlation (or a subsequent cross-correlation, or a cross-correlation) of the discrete Fourier transformed first and second auto-product functions. The cross-correlation generator 126 is then coupled with a delay optimization function generator 128, which is configured to generate a delay optimization function by taking the inverse discrete Fourier transform of the first-cross correlation. The delay optimization function generator 128 may generate the delay optimization function by combining delay optimization functions generated for one or more discrete Fourier transform blocks within the time delay generated by the time delay calculator 120. Alternatively, the delay optimization function generator 128 may generate the delay optimization function for one or more or all of the discrete Fourier transform blocks at a time.

A time delay calculator 130 is coupled with the delay optimization function generator 128 and is configured to calculate a time delay between the first signal 112 and the second signal 114 by identifying a global maximum value of the magnitude of the delay optimization function generated by the delay optimization function generator 128. The time delay calculator 130 is then configured to calculate a value of the time delay corresponding with the global maximum value. A frequency offset calculator 132 is coupled with the time delay calculator 130 and is configured to calculate a value of the frequency offset between the first signal 112 and the second signal 114 using the calculated time delay.

Both the time delay calculator 130 and the frequency offset calculator 132 are coupled with an output module 134 that is configured to communicate the time delay and the frequency offset value to an external processing module 136 coupled with the output module 134. The output module 134 may communicate the time delay and frequency offset to the external processing module 136 through, by non-limiting example, a transmission, a wire, a signal, a wireless connection, an board-level connection, an transistor-level connection, a logic circuit, a microprocessor, and any other system or device capable of transmitting an electrical signal. The external processing module 136 may be, by non-limiting example, a carrier-in-carrier satellite system, a radar gun, a microwave telecommunication system, a global positioning system, a cellular telephone base station, a sonar ranging system, a medical imaging system, a radio communication system, or any other system that can utilize a time delay and/or frequency offset.

Figure 15:
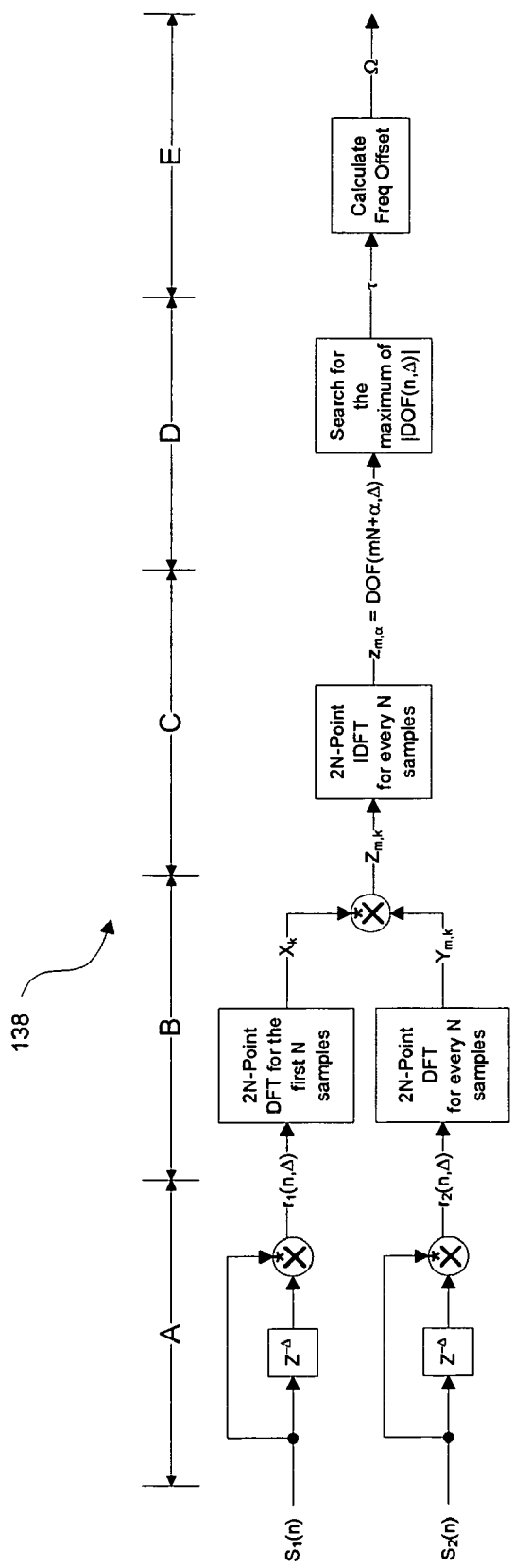
FIG. 15 is a functional block diagram of another implementation of a system for calculating a time delay and frequency offset.

Referring to FIG. 15, an implementation of a system for calculating a time delay and frequency offset 138 is illustrated in functional block form. As illustrated, section A of the system includes two signal inputs $S_1(n)$ and $S_2(n)$ which are split. The two signal inputs $S_1(n)$ and $S_2(n)$ may have been processed by various interference reduction filtering processing blocks to remove or reduce out of band interference. The interference reduction filtering processing blocks may include, by non-limiting example, low-pass filters, high-pass filters, band-pass filters, or any other system or method useful for preprocessing of the signal inputs $S_1(n)$ and $S_2(n)$. As illustrated, one copy of the signal passes directly to the complex conjugate multiplier (represented by the *) while the other copy is delayed by a value $\Delta$. The complex conjugate multiplier generates the functions $r_1(n,\Delta)$ and $r_2(n,\Delta)$, which are the first and second auto-product functions, respectively.

In section B, the functions $r_1(n,\Delta)$ and $r_2(n,\Delta)$ each pass through two discrete Fourier transform processing blocks. For $r_1(n,\Delta)$, the discrete Fourier transform processing operation is taken only for the first N samples; for $r_2(n,\Delta)$, the discrete Fourier transform processing operation is taken for every N samples. The resulting discrete Fourier transformed autoproduct function corresponding with $S_1(n)$ becomes $X_k$; the discrete Fourier transform autoproduct function corresponding with $S_2(n)$ becomes $Y_{m,k}$. The two functions then pass to another complex conjugate multiplier which generates the cross-correlation $z_{m,k}$.

In section C, the cross-correlation passes to an inverse discrete Fourier transform processing block that takes the inverse discrete Fourier transform of each cross-correlation corresponding with all N samples. Each of the N cross-correlations $z_{m,k}$ are used to generate a delay optimization function $DOF(mN+\alpha,\Delta)$ which passes to section D, where a maximum searching processing block seeks to identify the global maximum of the magnitude of the delay optimization function. If a global maximum value of the magnitude is identified, that value is used to calculate a time delay $\tau$ which passes to section E. In section E, the time delay $\tau$ is used by a frequency offset processing block to calculate a frequency offset $\Omega$ between $S_1(n)$ and $S_2(n)$.

The foregoing system examples and explanations are merely for the exemplary purposes of this disclosure. Many other system implementations and variations of systems and method and/or operational steps for such systems are possible. Those of ordinary skill in the art will readily be able to apply the principles disclosed in this document to a wide variety of other system and/or method implementations.

It will be understood that implementations are not limited to the specific components disclosed herein, as virtually any components consistent with the intended operation of a method and/or system implementation for a time delay and frequency offset calculation system may be utilized. Accordingly, for example, although particular modules, radar guns, towers, and microwave dishes may be disclosed, such components may comprise any shape, size, style, type, model, version, class, grade, measurement, concentration, material, weight, quantity, and/or the like consistent with the intended operation of a method and/or system implementation for a time delay and frequency offset calculation system may be used.

In places where the description above refers to particular implementations of time delay and frequency offset calculation systems, it should be readily apparent that a number of modifications may be made without departing from the spirit thereof and that these implementations may be applied to other time delay and frequency offset calculation systems.

The invention claimed is:

1. A method for calculating a time delay and a frequency offset between at least a first and a second signal, the method comprising:
   providing a first signal and a second signal using a signal generator hardware device, the first signal and the second signal having a common component, the second signal delayed in time relative to the first signal;
   generating, by a first auto-product function generator hardware device, a first auto-product function using the common component and the first signal;
   generating, by a second auto-product function generator hardware device, a second auto-product function using the common component and the second signal;
   generating, by a delay optimization function generator hardware device, a delay optimization function using the first auto-product function and the second auto-product function;
   calculating, by a time delay calculator hardware device, a time delay using an identified global maximum value of a magnitude of the delay optimization function; and
   calculating, by a frequency offset calculator hardware device, a frequency offset using the time delay.

2. The method of claim 1, wherein the identified global maximum value of a magnitude of the delay optimization function is calculated by comparing the value of the magnitude of the delay optimization function with a predetermined threshold or with a calculated threshold.

3. The method of claim 1, wherein more than one of the signal generator hardware device, the first auto-product function generator hardware device, the second auto-product function generator hardware device, the delay optimization function generator hardware device, the time delay calculator hardware device, and the frequency offset calculator hardware device are comprised of a same, single hardware device.

4. A method for calculating a time delay and a frequency offset from at least a first and a second signal derived from at least one signal source, the method comprising:
   selecting, using a time delay range module hardware device, a time delay range;
   subdividing, using the time delay range module hardware device, the time delay range into two or more discrete Fourier transform blocks for a first signal and for a second signal which is delayed in time relative to the first signal;
   generating, using a first auto-product function generator hardware device, a first auto-product function for one or more adjacent blocks corresponding to the first signal of the two or more discrete Fourier transform blocks and generating the discrete Fourier transform of the first auto-product function;
   generating, using a second auto-product function generator hardware device, a second auto-product function for two adjacent blocks corresponding to the second signal of the two or more discrete Fourier transform blocks and generating the discrete Fourier transform of the second auto-product function;
   generating, using a cross-correlation generator hardware device, a first cross-correlation of the discrete Fourier transformed first auto-product function and the discrete Fourier transformed second auto-product function;
   generating, using a delay optimization function generator hardware device, a delay optimization function for the two or more discrete Fourier transform blocks by taking the inverse discrete Fourier transform of the first cross-correlation;
   calculating, using a time delay calculator hardware device, a time delay through identifying a global maximum value of a magnitude of the delay optimization function across the time delay range;
   calculating, using a frequency offset calculator hardware device, a frequency offset with the time delay; and
   outputting, using an output module hardware device, the time delay and the frequency offset for processing by an external processing module hardware device.

5. The method of claim 4, wherein:
   generating a second auto-product function further comprises generating a subsequent second auto-product function for a second two adjacent blocks of the two or more discrete Fourier transform blocks corresponding to the second signal that are adjacent to the first two adjacent blocks and taking the discrete Fourier transform of the subsequent second auto-product function; and
   generating a first cross-correlation further comprises generating a second cross-correlation of the discrete Fourier transformed first auto-product function and the discrete Fourier transformed subsequent second auto-product function.

6. The method of claim 4, wherein the first signal is a desired signal and the second signal is a burst transmission containing a preamble and wherein if the global maximum value of the magnitude of the delay optimization function is identified, the preamble of the burst transmission corresponds to the desired signal.

7. The method of claim 6, further comprising receiving the burst transmission and communicating the burst transmission to the external processing module hardware device.

8. The method of claim 4, wherein the first signal comprises one or more desired signals and the second signal is a transmission containing a preamble and wherein if the global maximum value of the magnitude of the delay optimization function is identified, the preamble of the transmission corresponds with one of the one or more desired signals.

9. The method of claim 8, further comprising receiving the transmission and routing the transmission to one or more external processing modules corresponding with the transmission.

10. The method of claim 4, further comprising subdividing the time delay range into two or more subsequent discrete Fourier transform blocks for the first signal and for the second signal longer in time than the previous discrete Fourier transform blocks if no global maximum value of the magnitude of the delay optimization function for the previous discrete Fourier transform blocks was identified.

11. The method of claim 4, wherein the external processing module hardware device is coupled to one of a carrier-in-carrier satellite system, a radar gun system, a microwave telecommunication system, a global positioning system, and a cellular telephone base station.

12. The method of claim 4, wherein more than one of the time delay range module hardware device, the first auto-product function generator hardware device, the second auto-product function generator hardware device, cross-correlation hardware device, the delay optimization function generator hardware device, the time delay calculator hardware device, frequency offset calculator hardware device, and the output module hardware device are comprised of a same, single hardware device.

13. A method for calculating a time delay and a frequency offset from at least a first and a second signal derived from at least one signal source, the method comprising:
   selecting, using a time delay range module hardware device, a time delay range;
   subdividing, using the time delay range module hardware device, the time delay range into two or more discrete Fourier transform blocks for a first signal and for a second signal which is delayed in time relative to the first signal;
   generating, using a first auto-product function generator hardware device, a first auto-product function for one or more adjacent blocks corresponding with the first signal of the two or more discrete Fourier transform blocks and generating the discrete Fourier transform of the first auto-product function;
   generating, using a second auto-product function generator hardware device, a second auto-product function for a first two adjacent blocks corresponding with the second signal of the two or more discrete Fourier transform blocks and generating the discrete Fourier transform of the second auto-product function;
   generating, using a cross-correlation generator hardware device, a first cross-correlation of the discrete Fourier transformed first auto-product function and the discrete Fourier transformed second auto-product function;
   generating, using a delay optimization function generator hardware device, a delay optimization function for the first two adjacent Fourier transform blocks of the two or more discrete Fourier transform blocks by taking the inverse discrete Fourier transform of the cross-correlation;
   identifying, using the time delay calculator hardware device, a first maximum value of a magnitude of the delay optimization function for the first two adjacent Fourier transform blocks of the two or more discrete Fourier transform blocks;
   comparing, using the time delay calculator hardware device, the first maximum value of the magnitude of the delay optimization function to a threshold; and
   if the first maximum value of the magnitude is equal to or greater than the threshold, calculating a time delay using the time delay calculator hardware device and a frequency offset using a frequency offset calculator hardware device, the time delay calculator hardware device and frequency offset calculator hardware device using the first maximum value of the magnitude and outputting the time delay and frequency offset for processing by an external processing module hardware device.

14. The method of claim 13, wherein if the first maximum value of the magnitude is less than the threshold, the method further comprises:
   selecting a second two adjacent Fourier transform blocks for the second signal from the two or more discrete Fourier transform blocks, the second two adjacent Fourier transform blocks adjacent to the first two adjacent Fourier transform blocks;
   generating a subsequent second auto-product function;
   generating a second cross-correlation using the first auto-product function and the subsequent second auto-product function;
   generating a delay optimization function for the second two adjacent Fourier transform blocks;
   calculating a second maximum value of a magnitude of the delay optimization function; and
   determining whether the second maximum value of the magnitude of the delay optimization function is equal to or greater than the threshold.

15. The method of claim 14, further comprising:
   repeating selection of additional two adjacent Fourier transform blocks for the second signal from the two or more discrete Fourier transform blocks, the additional two adjacent Fourier transform blocks adjacent to the second two adjacent discrete Fourier transform blocks;
   generating a subsequent second auto-product function, a cross-correlation, and a delay optimization function for the additional two discrete adjacent Fourier transform blocks; and
   calculating a maximum value of a magnitude of the delay optimization function until the maximum value of the magnitude is equal to or greater than the threshold.

16. The method of claim 15, wherein after maximum values of the magnitudes of the delay optimization functions for all of the two or more discrete Fourier transform blocks have been calculated, if none of the maximum values of the magnitudes are equal to or greater than the threshold, the method further comprises subdividing the time delay range into two or more subsequent discrete Fourier transform blocks for the first signal and for the second signal, the two or more subsequent discrete Fourier transform blocks longer in time than the previous two or more discrete Fourier transform blocks.

17. The method of claim 13, wherein the first signal is a desired signal and the second signal is a burst transmission containing a preamble and wherein if the global maximum value of the magnitude of the delay optimization function is identified, the preamble of the burst transmission corresponds with the desired signal.

18. The method of claim 17, further comprising receiving the burst transmission and communicating the burst transmission to the external processing module.

19. The method of claim 13, wherein the first signal comprises one or more desired signals and the second signal is a transmission containing a preamble and wherein if the global maximum value of the magnitude of the delay optimization function is identified, the preamble of the transmission corresponds to one of the one or more desired signals.

20. The method of claim 19, further comprising receiving the transmission and routing the transmission to one or more external processing module hardware devices corresponding with the transmission.

21. The method of claim 13, wherein the external processing module hardware device is coupled to one of a carrier-in-carrier satellite system, a radar gun system, a microwave telecommunication system, a global positioning system, and a cellular telephone base station.

22. The method of claim 13, wherein the threshold is a predetermined threshold or a calculated threshold.

23. The method of claim 13, wherein more than one of the time delay range module hardware device, the first auto-product function generator hardware device, the second auto-product function generator hardware device, cross-correlation hardware device, the delay optimization function generator hardware device, and the time delay calculator hardware device, are comprised of a same, single hardware device.

24. A system for calculating a time delay and a frequency offset from at least a first and a second signal derived from at least one signal source, the system comprising:

one or more inputs for at least a first and a second signal;

a time delay range module coupled with the one or more inputs;

a first auto-product function generator coupled with the time delay range module and to the one or more inputs and configured to take the discrete Fourier transform of a first auto-product function generated using the first signal;

a second auto-product function generator coupled with the time delay range module and to the one or more inputs and configured to take the discrete Fourier transform of a second auto-product function generated using the second signal;

a cross-correlation generator coupled with the first and the second auto-product function generators, the cross-correlation generator configured to generate a first cross-correlation of the discrete Fourier transformed first auto-product function and the discrete Fourier transformed second auto-product function;

a delay optimization function generator coupled with the cross-correlation generator, the delay optimization function generator configured to generate a delay optimization function by taking the inverse discrete Fourier transform of the first cross-correlation;

a time delay calculator coupled with the delay optimization function generator, the time delay calculator configured to calculate a time delay using an identified global maximum value of a magnitude of the delay optimization function;

a frequency offset calculator coupled with the time delay calculator, the frequency offset calculator configured to calculate a frequency offset using the time delay; and an output module coupled with the time delay calculator, the frequency offset calculator, and an external processing module, the output module configured to communicate the time delay and the frequency offset value to the external processing module.

25. The system of claim 24, wherein the time delay range module is configured to:

select a time delay range; and subdivide the time delay range into two or more discrete Fourier transform blocks for the first signal and for the second signal;

wherein the first auto-product function generator and the second auto-product function generator are configured to:

generate the first auto-product function using the first signal and the second auto-product function using the second signal for one or more adjacent blocks of the two or more discrete Fourier transform blocks that correspond with the first signal and for the two or more discrete Fourier transform blocks that correspond with the second signal, respectively; and wherein the delay optimization function generator is configured to generate the delay optimization function for the two or more discrete Fourier transform blocks.

26. The system of claim 24, wherein the external processing module is one of a carrier-in-carrier satellite system, a radar gun system, a microwave telecommunication system, a global positioning system, and a cellular telephone base station.

* * * * *